US012683429B2

(12) United States Patent
Chang

(10) Patent No.: US 12,683,429 B2
(45) Date of Patent: Jul. 14, 2026

(54) NON-INTRUSIVE LOAD IDENTIFICATION METHOD

(71) Applicant: Minghsin University of Science and Technology, Xinfeng Township, Hsinchu County (TW)

(72) Inventor: Hsueh-Hsien Chang, Taoyuan City (TW)

(73) Assignee: MINGHSIN UNIVERSITY OF SCIENCE AND TECHNOLOGY, Xinfeng Township, Hsinchu County (TW)

( * ) Notice: Subject to any disclaimer, the term of this patent is extended or adjusted under 35 U.S.C. 154(b) by 373 days.

(21) Appl. No.: 18/403,493

(22) Filed: Jan. 3, 2024

(65) Prior Publication Data

US 2024/0235255 A1 Jul. 11, 2024

(30) Foreign Application Priority Data

Jan. 6, 2023 (TW) ................................. 112100641

(51) Int. Cl.
*H02J 13/12* (2026.01)
(52) U.S. Cl.
CPC .................................... *H02J 13/12* (2026.01)
(58) Field of Classification Search
CPC ................................. G01R 31/00; H02J 13/12
See application file for complete search history.

(56) References Cited

U.S. PATENT DOCUMENTS

| | | | |
|---|---|---|---|
| 2009/0045804 A1* | 2/2009 | Durling .................. | G01D 4/008 |
| | | | 324/140 R |
| 2010/0305889 A1* | 12/2010 | Tomlinson, Jr. ......... | G06N 7/01 |
| | | | 702/62 |
| 2012/0004871 A1* | 1/2012 | Tsao .................... | G01R 19/2513 |
| | | | 702/61 |
| 2019/0187736 A1* | 6/2019 | Toizumi .................... | G05F 1/70 |
| 2023/0296654 A1* | 9/2023 | Lu .......................... | G01R 22/10 |
| | | | 324/141 |

FOREIGN PATENT DOCUMENTS

| | | |
|---|---|---|
| CN | 113673480 A | 11/2021 |
| TW | I492182 B | 7/2015 |

* cited by examiner

*Primary Examiner* — Omer S Khan
(74) *Attorney, Agent, or Firm* — Birch, Stewart, Kolasch & Birch, LLP

(57) ABSTRACT

A non-intrusive load identification method employs a non-intrusive detection device to detect a total current on the main power line (i.e., power entrance) of a power system to identify the types of primary loads. The non-intrusive load identification method obtains a turned-on time interval when the present load of the primary loads is turned on or a turned-off time interval when the present load of the primary loads is turned off, obtains a transient turned-on current or a transient turned-off current based on the turned-on time interval or the turned-off time interval, and converts the transient turned-on current or the transient turned-off current into the present power feature of the present load, thereby identifying the type of the present load.

4 Claims, 15 Drawing Sheets

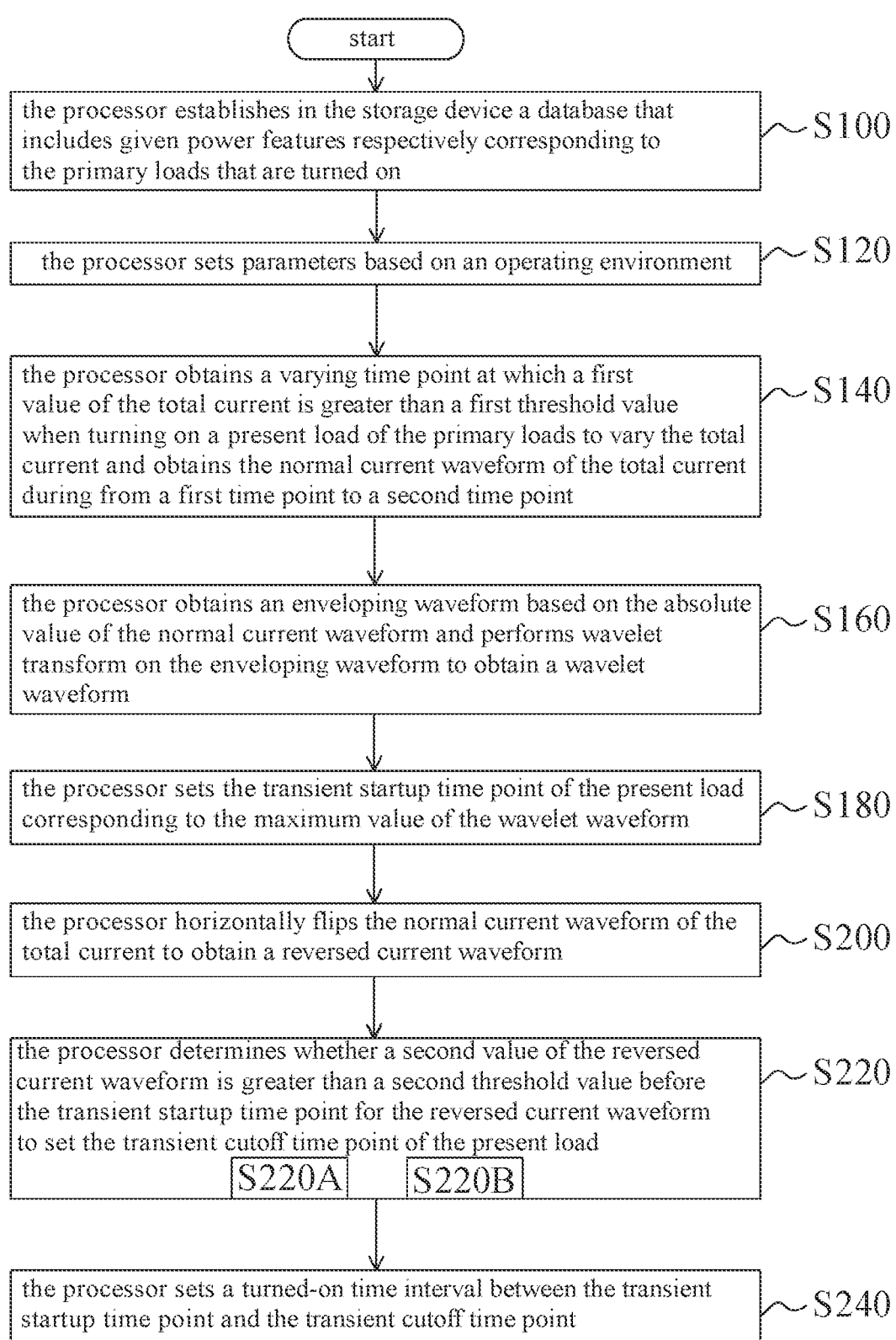

start the processor establishes in the storage device a database that includes given power features respectively corresponding to the primary loads that are turned on          ~S100 the processor sets parameters based on an operating environment          ~S120 the processor obtains a varying time point at which a first value of the total current is greater than a first threshold value when turning on a present load of the primary loads to vary the total current and obtains the normal current waveform of the total current during from a first time point to a second time point          ~S140 the processor obtains an enveloping waveform based on the absolute value of the normal current waveform and performs wavelet transform on the enveloping waveform to obtain a wavelet waveform          ~S160 the processor sets the transient startup time point of the present load corresponding to the maximum value of the wavelet waveform          ~S180 the processor horizontally flips the normal current waveform of the total current to obtain a reversed current waveform          ~S200 the processor determines whether a second value of the reversed current waveform is greater than a second threshold value before the transient startup time point for the reversed current waveform to set the transient cutoff time point of the present load          ~S220

S220A          S220B the processor sets a turned-on time interval between the transient startup time point and the transient cutoff time point          ~S240

Fig. 3A

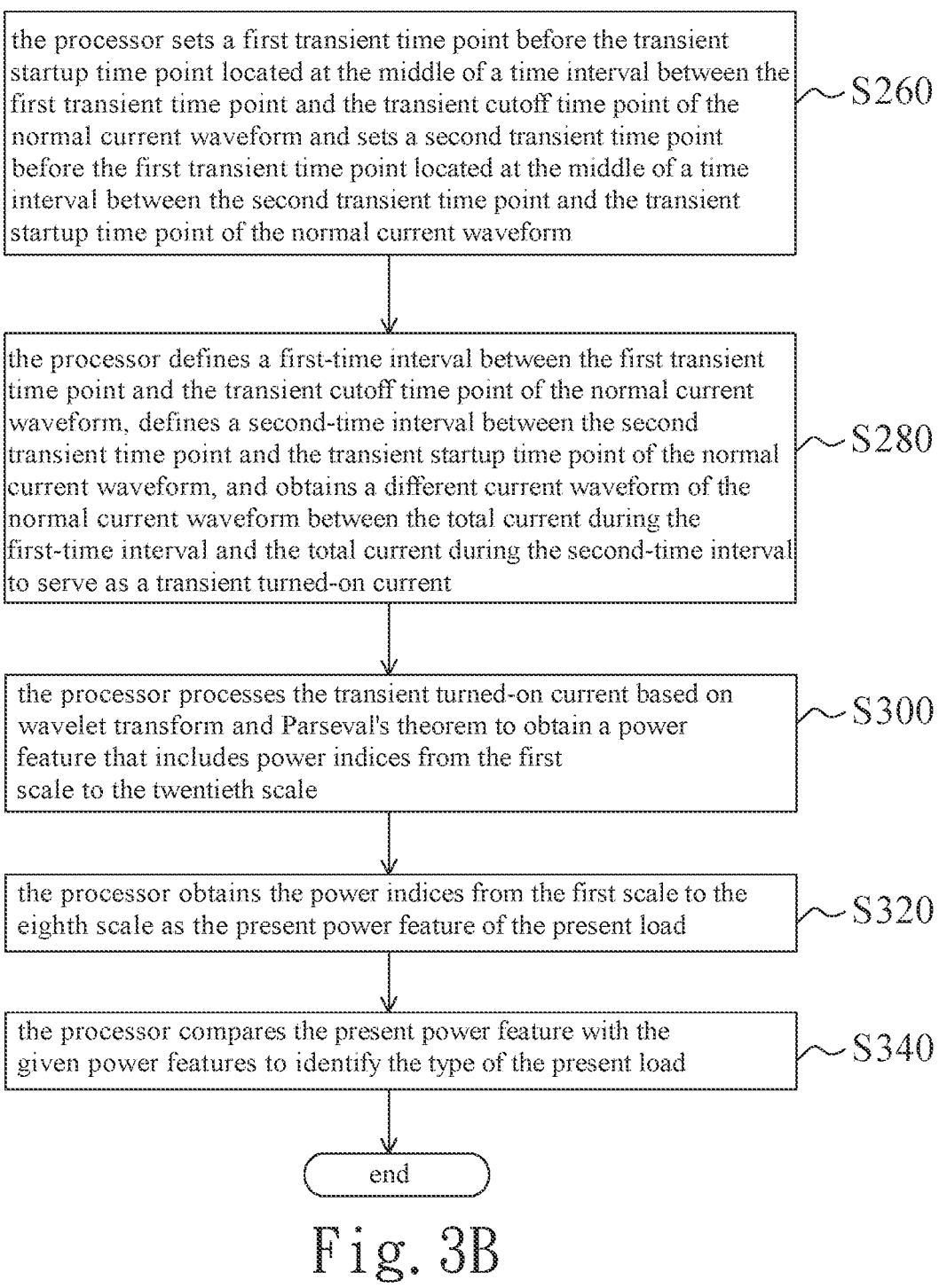

the processor sets a first transient time point before the transient startup time point located at the middle of a time interval between the first transient time point and the transient cutoff time point of the normal current waveform and sets a second transient time point before the first transient time point located at the middle of a time interval between the second transient time point and the transient startup time point of the normal current waveform     ~S260 the processor defines a first-time interval between the first transient time point and the transient cutoff time point of the normal current waveform, defines a second-time interval between the second transient time point and the transient startup time point of the normal current waveform, and obtains a different current waveform of the normal current waveform between the total current during the first-time interval and the total current during the second-time interval to serve as a transient turned-on current     ~S280 the processor processes the transient turned-on current based on wavelet transform and Parseval's theorem to obtain a power feature that includes power indices from the first scale to the twentieth scale     ~S300 the processor obtains the power indices from the first scale to the eighth scale as the present power feature of the present load     ~S320 the processor compares the present power feature with the given power features to identify the type of the present load     ~S340 end

Fig. 3B

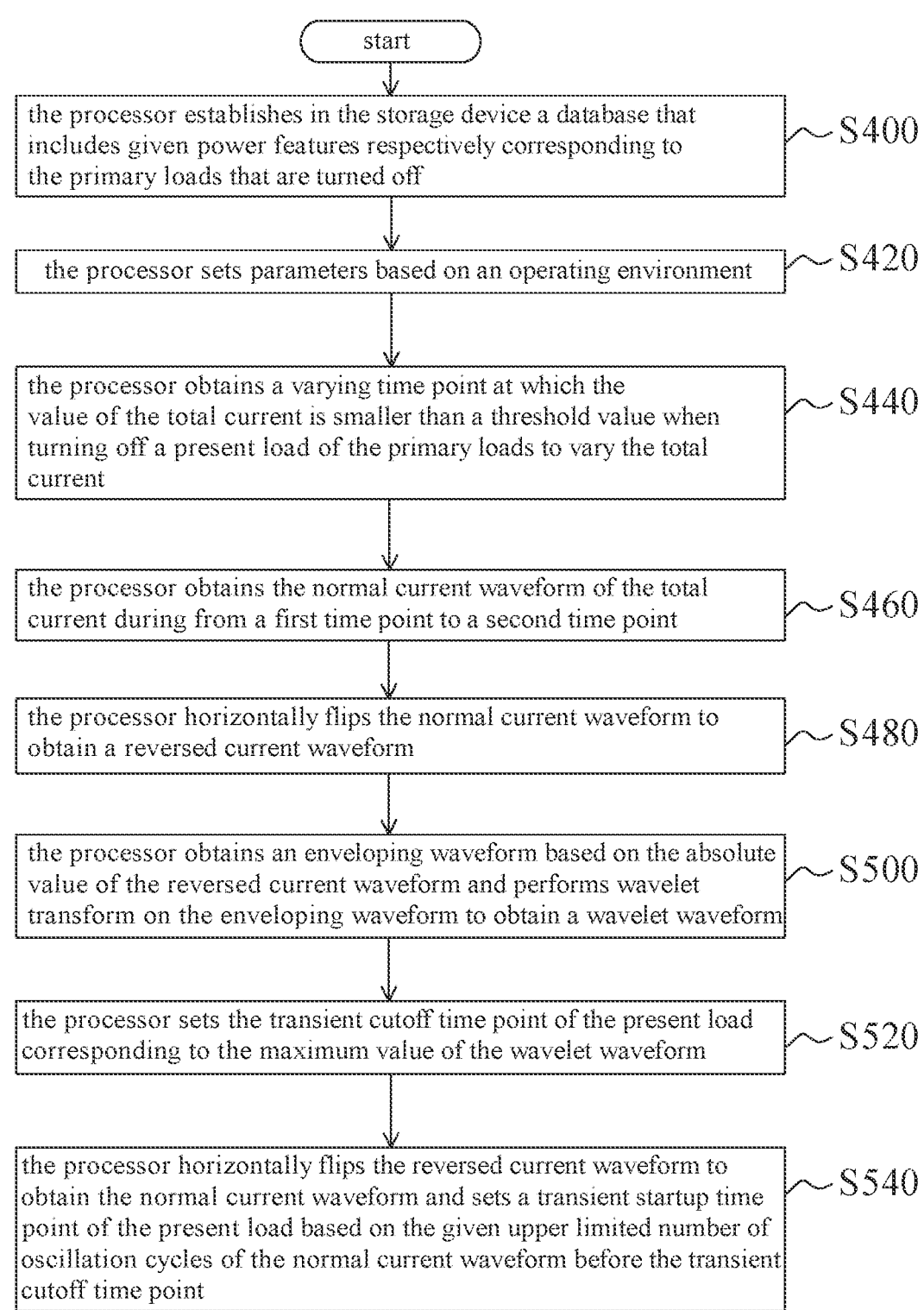

start the processor establishes in the storage device a database that includes given power features respectively corresponding to the primary loads that are turned off ~ S400 the processor sets parameters based on an operating environment ~ S420 the processor obtains a varying time point at which the value of the total current is smaller than a threshold value when turning off a present load of the primary loads to vary the total current ~ S440 the processor obtains the normal current waveform of the total current during from a first time point to a second time point ~ S460 the processor horizontally flips the normal current waveform to obtain a reversed current waveform ~ S480 the processor obtains an enveloping waveform based on the absolute value of the reversed current waveform and performs wavelet transform on the enveloping waveform to obtain a wavelet waveform ~ S500 the processor sets the transient cutoff time point of the present load corresponding to the maximum value of the wavelet waveform ~ S520 the processor horizontally flips the reversed current waveform to obtain the normal current waveform and sets a transient startup time point of the present load based on the given upper limited number of oscillation cycles of the normal current waveform before the transient cutoff time point ~ S540

Fig. 4A

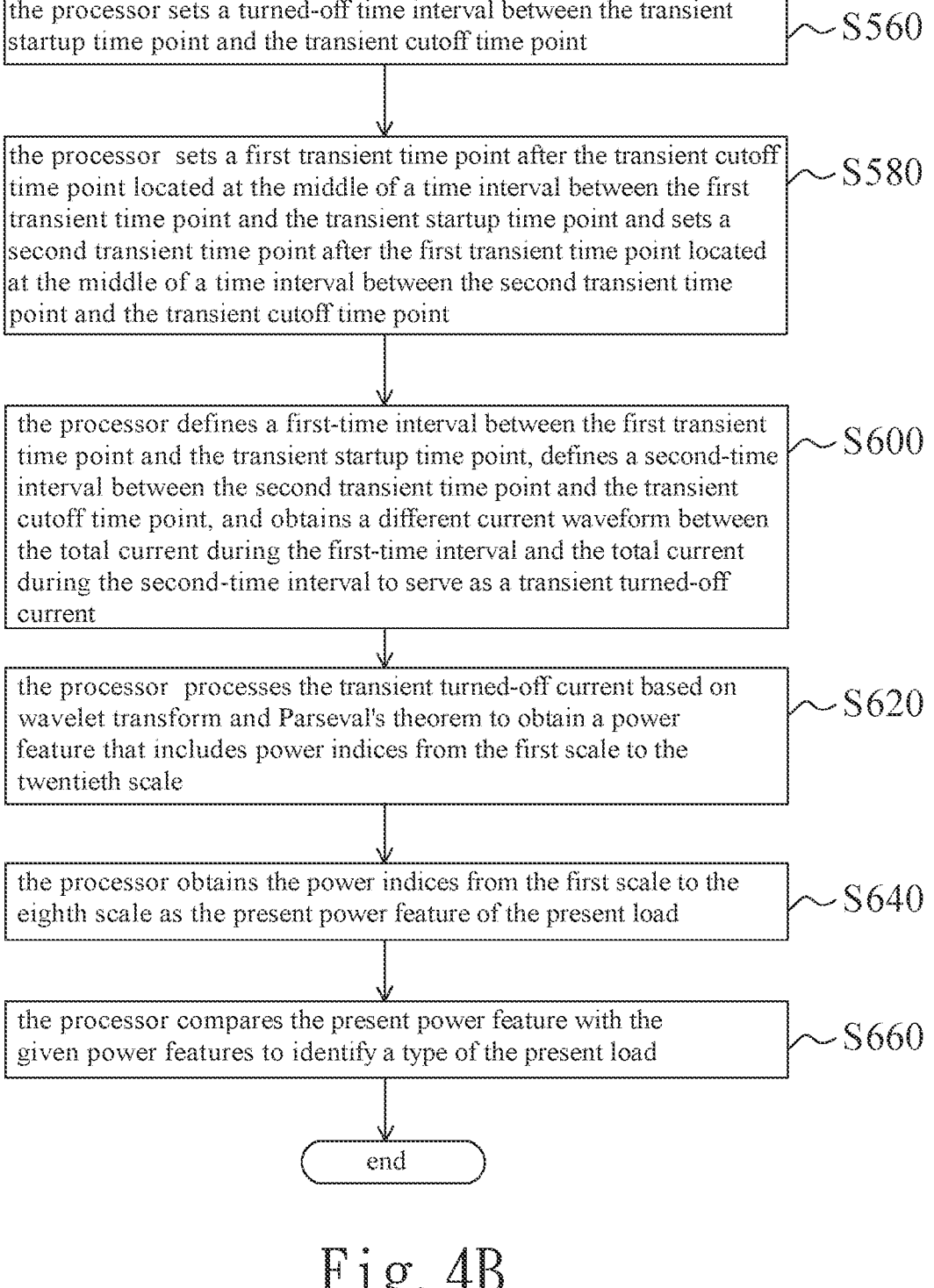

the processor sets a turned-off time interval between the transient startup time point and the transient cutoff time point  ~S560 the processor sets a first transient time point after the transient cutoff time point located at the middle of a time interval between the first transient time point and the transient startup time point and sets a second transient time point after the first transient time point located at the middle of a time interval between the second transient time point and the transient cutoff time point  ~S580 the processor defines a first-time interval between the first transient time point and the transient startup time point, defines a second-time interval between the second transient time point and the transient cutoff time point, and obtains a different current waveform between the total current during the first-time interval and the total current during the second-time interval to serve as a transient turned-off current  ~S600 the processor processes the transient turned-off current based on wavelet transform and Parseval's theorem to obtain a power feature that includes power indices from the first scale to the twentieth scale  ~S620 the processor obtains the power indices from the first scale to the eighth scale as the present power feature of the present load  ~S640 the processor compares the present power feature with the given power features to identify a type of the present load  ~S660 end

Fig. 4B

NON-INTRUSIVE LOAD IDENTIFICATION METHOD

BACKGROUND OF THE INVENTION

This application claims priority for the TW patent application no. 112100641 filed on 6 Jan. 2023, the content of which is incorporated by reference in its entirely.

Field of the Invention

The invention relates to a load identification method, particularly to a non-intrusive load identification method.

Description of the Related Art

In recent years, governments worldwide have been advocating energy conservation and carbon reduction policies and urging nations to sign agreements to restrain greenhouse gas emissions. This has accelerated the development of renewable energy and the advancement of energy management. For the energy management of the power system, experts and scholars have introduced the concept of the Smart Grid. The Smart Grid encompasses power generation, transmission, distribution, and end-users. Emphasis is placed on end-user applications with the development of smart meters. These meters support various electricity pricing structures, provide users with energy consumption information, and encourage voluntary energy conservation.

One of the functions of a smart meter is to record end-user load usage information. The recoding purpose is to provide users with information on the usage and energy consumption of electrical loads, thereby guiding users to voluntarily conserve energy and achieve energy conservation, carbon reduction, and energy management. To achieve these objectives, multiple sets of power measurement devices (such as voltage/current sensors) S are deployed at the end-user according to the number of loads to monitor their usage states, as illustrated in FIG. 1. The power system 200 supplies power to multiple loads 2-1~2-N and 2-(N+1)~2-M through a main power line 1. At least one power measurement device S' (such as a smart socket) is installed at each load point. This monitoring method is referred to as an intrusive monitoring method.

Furthermore, the intrusive load monitoring device 5A needs to install a power measurement device S' on each branch to sense the operation of loads 2-1~2-M. When a load is turned on or turned off, the power measurement device S' will transmit messages to the load monitoring device 5A via internal connection lines. These messages can also be simultaneously sent to a remote data center for further analysis to understand the usage states of the loads. The determination of load usage states is mainly based on the power signatures monitored by power measurement devices S'. Power signatures, as the name suggests, are the features that appear when the load is in operation. These features can be broadly categorized into transient power signatures and steady-state power signatures. Therefore, monitoring and remotely controlling operations can be carried out by on-site control devices to achieve functions such as data collection, load control, and alarms. However, this monitoring method for remotely controlling loads requires many power-measurement devices S', thereby leading to increased installation costs and difficulties in equipment maintenance.

SUMMARY OF THE INVENTION

The invention provides a non-intrusive load identification method, which employs a non-intrusive detection device to detect a total current on the main power line of a power system and compares a power signature generated based on the variation of the total current with data in a database to identify the primary load that is turned on/off. Then, the power management system can calculate the usage demand of the primary loads as a reminder to users to save power and reduce unnecessary power consumption. The non-intrusive load identification method generates power features in a very short time, determines the type of the primary load that is turned on/off within a few cycles, and simultaneously achieves the load identification of the primary load having the multiple number of operating states.

In order to achieve the foregoing purposes, a non-intrusive load identification method employs a non-intrusive detection device to analyze a total current on the main power line (i.e., power entrance) of a power system to identify the types of primary loads. The main power line is coupled to the non-intrusive detection device, other loads that operate and the primary loads. The non-intrusive load identification method includes: establishing a database that includes given power features respectively corresponding to the primary loads that are turned on; obtaining a varying time point at which a first variation of the total current is greater than a first threshold value when turning on a present load of the primary loads to vary the total current; obtaining the normal current waveform of the total current during from a first time point to a second time point, wherein the first time point occurs before the varying time point and the second time point occurs after the varying time point; obtaining an enveloping waveform based on the absolute value of the normal current waveform and performing wavelet transform on the enveloping waveform to obtain a wavelet waveform; setting a transient startup time point of the present load corresponding to the maximum value of the wavelet waveform; horizontally flipping the normal current waveform to obtain a reversed current waveform; determining whether a second variation of the reversed current waveform is greater than a second threshold value before the transient startup time point for the reversed current waveform to set a transient cutoff time point of the present load: when the second variation of the reversed current waveform is greater than the second threshold value, setting the transient cutoff time point at which the second variation is greater than the second threshold value; and when the second variation of the reversed current waveform is not greater than the second threshold value, setting the transient cutoff time point based on the given upper limited number of oscillation cycles of the normal current waveform and the transient startup time point; setting a turned-on time interval between the transient startup time point and the transient cutoff time point; setting a first transient time point before the transient startup time point located at the middle of a time interval between the first transient time point and the transient cutoff time point of the normal current waveform and setting a second transient time point before the first transient time point located at the middle of a time interval between the second transient time point and the transient startup time point of the normal current waveform; defining a first-time interval between the first transient time point and the transient cutoff time point of the normal current waveform, defining a second-time interval between the second transient time point and the transient startup time point of the normal current waveform, and obtaining a different current waveform of the normal current waveform between the total current during the first-time interval and the total current during the second-time interval to serve as a transient turned-on current; processing the transient turned-on current based on wavelet transform and the Parseval's theorem to obtain a power feature that includes power indices from the first scale to the twentieth scale; obtaining the power indices from the first scale to the eighth scale as the present power feature of the present load; and comparing the present power feature with the given power features to identify the type of the present load.

In order to achieve the foregoing purposes, a non-intrusive load identification method employs a non-intrusive detection device to analyze a total current on the main power line (i.e., power entrance) of a power system to identify the types of primary loads. The main power line is coupled to the non-intrusive detection device, other loads that operate and the primary loads. The non-intrusive load identification method includes: establishing a database that includes given power features respectively corresponding to the primary loads that are turned off; obtaining a varying time point at which a variation of the total current is smaller than a threshold value when turning off a present load of the primary loads to vary the total current; obtaining the normal current waveform of the total current during from a first time point to a second time point, wherein the first time point occurs before the varying time point and the second time point occurs after the varying time point; horizontally flipping the normal current waveform to obtain a reversed current waveform; obtaining an enveloping waveform based on the absolute value of the reversed current waveform and performing wavelet transform on the enveloping waveform to obtain a wavelet waveform; setting a transient cutoff time point of the present load corresponding to the maximum value of the wavelet waveform; horizontally flipping the reversed current waveform to obtain the normal current waveform and setting a transient startup time point of the present load based on the given upper limited number of oscillation cycles of the normal current waveform before the transient cutoff time point; setting a turned-off time interval between the transient startup time point and the transient cutoff time point; setting a first transient time point after the transient cutoff time point located at the middle of a time interval between the first transient time point and the transient startup time point and setting a second transient time point after the first transient time point located at the middle of a time interval between the second transient time point and the transient cutoff time point; defining a first-time interval between the first transient time point and the transient startup time point; defining a second-time interval between the second transient time point and the transient cutoff time point, and obtaining a different current waveform between the total current during the first-time interval and the total current during the second-time interval to serve as a transient turned-off current; processing the transient turned-off current based on wavelet transform and the Parseval's theorem to obtain a power feature that includes power indices from the first scale to the twentieth scale; obtaining the power indices from the first scale to the eighth scale as the present power feature of the present load; and comparing the present power feature with the given power features to identify the type of the present load.

Below, the embodiments are described in detail in cooperation with the drawings to make easily understood the technical contents, features, and accomplishments of the invention.

BRIEF DESCRIPTION OF THE DRAWINGS

FIGS. 3A-3B are flowcharts of a non-intrusive load identification method when a present load of primary loads is turned on according to an embodiment of the invention;

FIGS. 4A-4B are flowcharts of a non-intrusive load identification method when a present load of primary loads is turned off according to an embodiment of the invention;

DETAILED DESCRIPTION OF THE INVENTION

Figure 1:
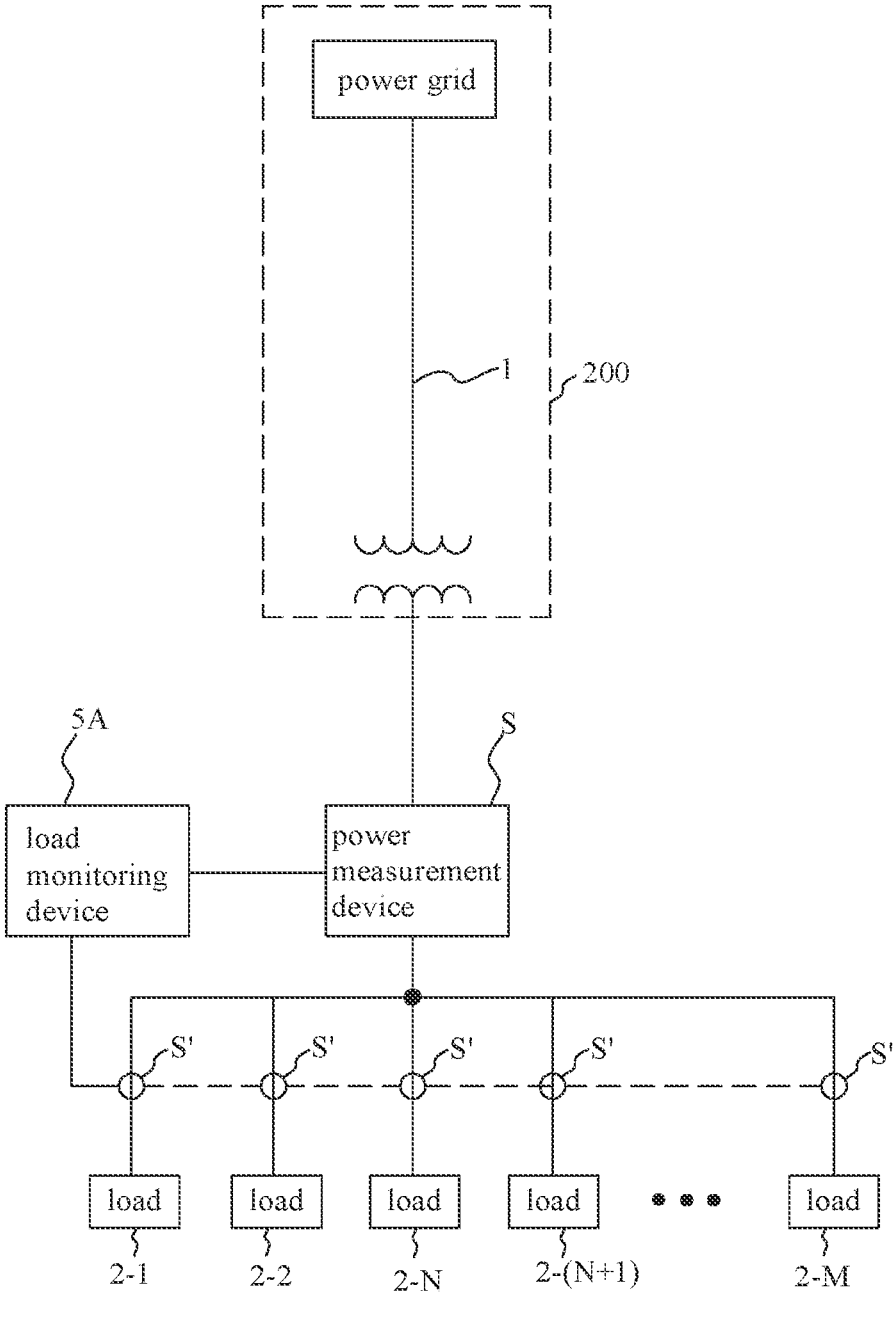
FIG. 1 is a diagram schematically illustrating a conventional intrusive load monitoring system for monitoring a power system.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/ without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

Figure 2:
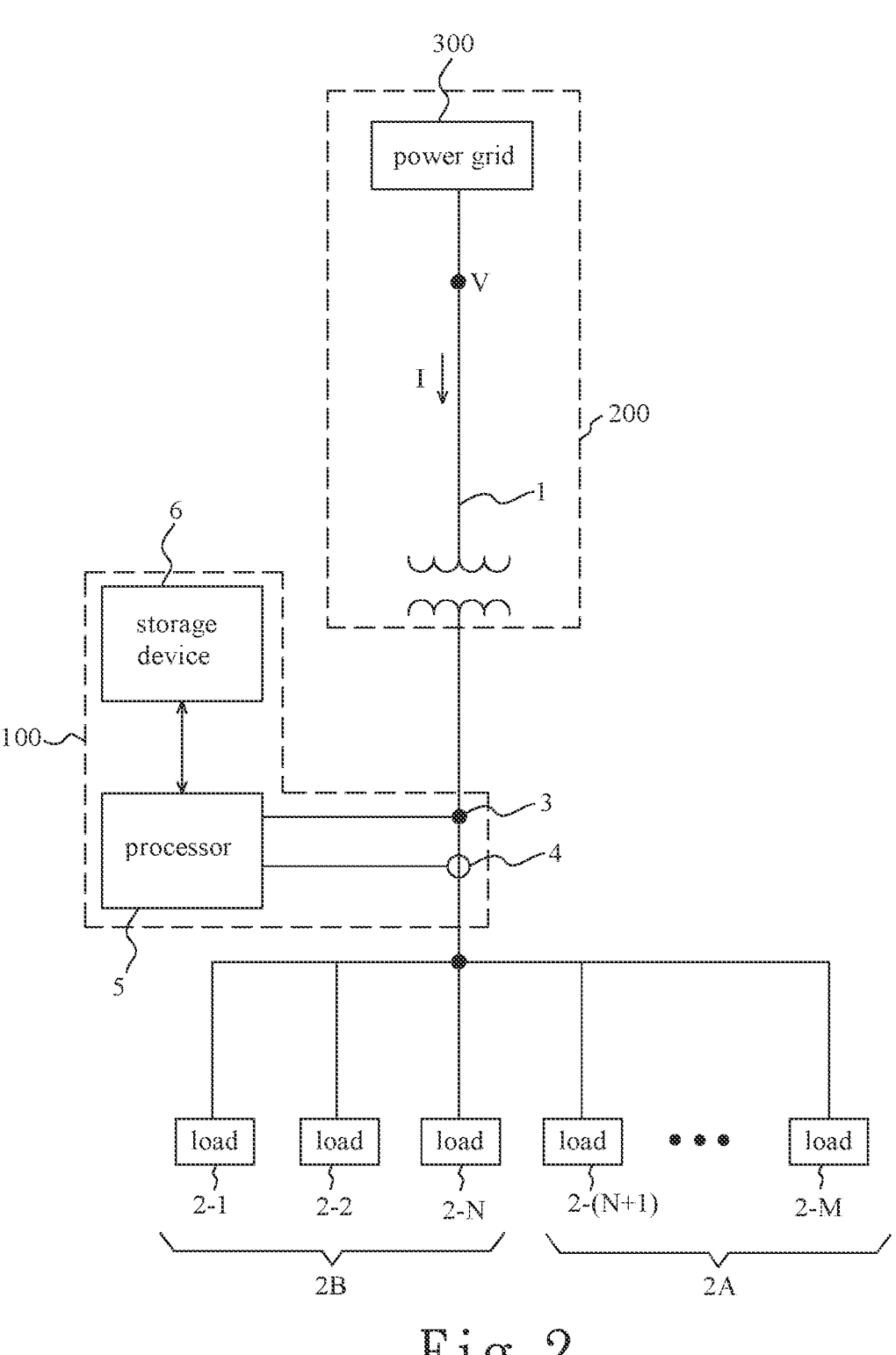
FIG. 2 is a diagram schematically illustrating a non-intrusive load monitoring system for monitoring a power system according to an embodiment of the invention.

FIG. 2 is a diagram schematically illustrating a non-intrusive load monitoring system for monitoring a power system according to an embodiment of the invention. The power system 200 includes a power grid 300 and a main power line 1. The power grid 300 is coupled to loads 2-1~2-M through the main power line 1. The loads 2-1~2-N are called primary loads 2B and the loads 2-(N+1)~2-M are called other loads 2A. N and M are positive integers and M is greater than (N+1). When the loads 2-1~2-M are turned on to operate, the power grid 300 supply power to the loads 2-1~2-M. The grid 300 may be, but not limited to, mains power, a power generator, a renewable power source, or a suitable power source. The main power line 1 of the power system 200 is coupled to a non-intrusive detection device 100, the primary loads 2B, and the other loads 2A. The non-intrusive detection device 100 monitors the power of the main power line 1 to determine the usage state of the loads 2-1~2-N. The non-intrusive detection device 100 includes a voltage sensor 3, a current sensor 4, a processor 5, and a storage device 6. The voltage sensor 3 and the current sensor 4 are coupled to the loads 2-1~2-M, the main power line 1, and the processor 5. The processor 5 is coupled to the storage device 6. The voltage sensor 3 and the current sensor 4 respectively sense a total voltage V and a total current I on the main power line 1.

Specifically, the voltage sensor 3 may be at least one potential transformer. The voltage sensor 3 is configured to sense the total voltage V on the main power line 1 and provide a voltage signal corresponding to the total voltage V for the processor 5. The current sensor 4 may be at least one current transformer. The current sensor 4 is configured to sense the total current I on the main power line 1 and provide a current signal corresponding to the total current I for the processor 5. The numbers of the potential transformer and the current transformer depend on the number of phases of the power system 200. The processor 5 can be physically or wirelessly connected to a power management system, a meter data management system, or a cloud database server. The processor 5 can also be configured in, for example, but not limited to, the power management system, the meter data management system, or the cloud database server (not illustrated). The power management system correspondingly monitors the power system 200 based on information related to the total voltage V and the total current I on the main power line 1. The other loads 2A include, but not limited to, TVs, desk lamps, fans, air-conditioning, network gateways, routers, or divine lamps in a standby state. The primary loads 2B include, but not limited to, hair dryers or vacuum cleaners. The processor 5 monitors one of the primary loads 2B that is turned on or off and identifies its type. The other loads 2A are viewed as background loads that are not objects monitored by the processor 5.

Furthermore, the non-intrusive detection device 100 installs sensors at a power source (e.g., the main power line 1) to measure the total voltage V and the total current I rather than installs power measurement devices (for example, but not limited to smart sockets) on all paths respectively connected to the loads 2-1~2-M. The non-intrusive detection device 100 detects the total current I on the main power line 1 of the power system 200 and compares a power feature generated based on the variation of the total current I with data in the storage device 6 to identify the primary load 2B that is turned on/off. Then, the power management system can calculate the usage demand of the primary load 2B as a reminder to users to save power and reduce unnecessary power consumption.

FIGS. 3A-3B are flowcharts of a non-intrusive load identification method when a present load of primary loads is turned on according to an embodiment of the invention. Referring to FIG. 2 and FIGS. 3A-3B, a non-intrusive load identification method will be introduced as follows. In the non-intrusive load identification method, the other loads 2A operate and only one of the primary loads 2B is turned on and identified. In general, the load may be turned on, operating, or turned off. The non-intrusive load identification method focuses on the turned-on and turned-off events of the load. The turned-on and turned-off events are transient events. As a result, a transient startup time point and a transient cutoff time point occur in the turned-on event of the load and a transient startup time point and a transient cutoff time point also occur in the turned-off event of the load.

The non-intrusive load identification method employs the non-intrusive detection device 100 to detect the total current I on the main power line 1 of the power system 200 to identify the types of the primary loads 2B. Firstly, in Step S100, the processor 5 establishes in the storage device 6 a database that includes given power features respectively corresponding to the primary loads 2B that are turned on. The given power features may include power indicator diagrams (e.g., power intensity), steady-state real power, steady-state reactive power, the harmonic content of each order of steady-state voltage or current waveforms, steady-state current waveforms, turned-on/off transient current waveforms, turned-on/off instantaneous power, or a combination of these. The non-intrusive load identification method obtains the present power feature of a present load of the primary loads 2B that is turned on, compares the present power feature with the given power features in the database, and identifies the type of the present load when the given power feature is similar or identical to the present power feature.

In Step S120, the processor 5 sets parameters based on an operating environment. The operating environment includes, but is not limited to, parameters such as voltage frequency (typically the mains frequency of 60 Hz), sampling frequency (e.g., but not limited to, 10.08 kHz), the given number of oscillation cycles (e.g., but not limited to, 4 cycles), and startup threshold (e.g., but not limited to, 1.05 times). These parameters enable the non-intrusive load identification method to establish a mechanism for determining the turned-on state of the primary loads 2B. If the operating environment has been pre-set to a specific configuration or the parameters of the operating environment have been set to specific values, Step S120 can be omitted and is not essential for the execution of the non-intrusive load identification method according to the present invention.

In Step S140, the processor 5 obtains a varying time point at which a first variation of the total current is greater than a first threshold value when turning on a present load of the primary loads 2B to vary the total current I and obtains the normal current waveform of the total current I during from a first time point to a second time point. The first time point occurs before the varying time point and the second time point occurs after the varying time point. Specifically, a transient current is generated to vary the total current I when one of the primary loads 2-1~2-N is turned on. In other words, the waveform of the total current I includes the waveform of the transient current of the primary loads 2-1~2-N that are turned on. Therefore, the non-intrusive load identification method can determine that one of the loads 2-1~2-N is turned on by detecting the total current I with the first variation greater than the first threshold value (i.e., startup threshold). In practice, the processor 5 can preset the first threshold value as the startup threshold being 1.05 times. The processor 5 uses a window of some cycles to scan the waveform of the total current I from left to right and compares the first average value of the current peaks of the total current I selected by the window at a previous time point with the second average value of the current peaks of the total current I selected by the window at a next time point. When the second average value of the current peaks is greater than 1.05 times the first average value of the current peaks, the first variation of the total current I is greater than the first threshold value.

The first time point and the second time point may be set based on the main frequency. The invention is not limited to the mains frequency of 60 Hz. The total current I has at least 36 cycles in a time duration between the first time point and the second time point when the main frequency is 60 Hz. The given number of oscillation cycles is preferably 2~12, but the invention is not limited thereto. Thus, one cycle of the total current I has 168 sampling points. In addition, the waveform of 36 cycles of the total current I can be recorded by a physical instrument. In another aspect, the database can store the waveform of each cycle of the total current I, wherein each cycle has an effective current value, such as an average current value, root-mean-square current value, or maximum value. The processor 5 compares the waveform of the total current I stored in the database with the waveform of the total current I recorded by the physical instrument to determine whether the waveform of the total current I recorded by the physical instrument is a normal waveform for turning on the present load, lest the abnormal waveform of the total current I be obtained. Specifically, the total current I has 36 cycles. Thus, the processor 5 may calculate the average current value of each cycle of the recorded total current I as an effective current value to determine whether the waveform of the recorded total current I is normal.

The normal current waveform of the total current I has positive values and negative values. In Step S160, the processor 5 obtains an enveloping waveform based on the absolute value of the normal current waveform and performs wavelet transform on the enveloping waveform to obtain a wavelet waveform in order to obtain the actual transient startup time point of the present load.

The wavelet transform is a computational method based on wavelet theory and mainly used to process the large and complex data of power quality events. The wavelet transform is discrete. The discrete wavelet transform (DWT) can be achieved using low-pass and high-pass filters. The signal passes through a low-pass filter to generate an approximation value and passes through a high-pass filter to generate a detail value. In practical applications, a one-dimensional multi-level structure is commonly used for wavelet transform. Moreover, the absolute value of the current waveform is not limited to using a simplified envelope line for wavelet transform. The invention uses, but not limited to, a filtering method before performing the wavelet transform.

The first-level decomposition represents the signal source passing through one layer of decomposition, resulting in an approximation value and a detail value. For the second-level decomposition, one can use a low-pass filter of the first-level decomposition followed by a high-pass filter and a low-pass filter to obtain two detail values and one approximation value. By analogy, the other decomposition can be performed. In this step, the positive absolute value of current waveform is firstly simplified to the enveloping waveform. The enveloping waveform is then subjected to wavelet transform to generate multiple parameter signals representing the foregoing approximation and detail values. In this step, the wavelet transform mainly extracts the wavelet coefficient d1. Alternatively, the wavelet transform can extract, but not limited to, wavelet coefficients A1, A2, d2, d3, etc.

In Step S180, the processor 5 sets the transient startup time point of the present load corresponding to the maximum value of the wavelet waveform. Since the average current value of the total current I for turning on the present load detects the turned-on event of the present load, the maximum value of the wavelet waveform for turning on the present load corresponds to the transient startup time point of the present load. In the process of turning on the present load, the transient cutoff time point of the present load also occurs. The processor 5 can obtain a transient current of the present load appearing between the transient startup time point and the transient cutoff time point to identify the type of the present load.

In Step S200, the processor 5 horizontally flips the normal current waveform of the total current I to obtain a reversed current waveform. In Step S220, the processor 5 determines whether a second variation of the reversed current waveform is greater than a second threshold value before the transient startup time point for the reversed current waveform to set the transient cutoff time point of the present load. The processor 5 presets the second threshold value as a cutoff threshold being 1.05 times. Specifically, the processor 5 uses a window of some cycles to scan the reversed current waveform from left to right and compares the third average value of current peaks of the total current I selected by the window at a previous time point with the fourth average value of the current peaks of the total current I selected by the window at a next time point. When the average value of the fourth current peaks is greater than 1.05 times the average value of the third current peaks, the second variation of the reversed current waveform is greater than the second threshold value. After the transient cutoff time point for the normal current waveform, the total current I enters a steady state. If the present load is an inductive or electromagnetic load such as a motor or a compressor, the second variation of the reversed current waveform will be greater than the second threshold value. If the present load is not an inductive or electromagnetic load, the second variation of the reversed current waveform will be not greater than the second threshold value. The processor 5 can determines whether the reversed current waveform oscillates for a few cycles by determining whether the second variation of the reversed current waveform is greater than the second threshold value after the transient startup time point for the normal current waveform. If the second variation of the reversed current waveform is greater than the second threshold value before the transient startup time point for the reversed current waveform, the normal current waveform oscillates after the transient startup time point for a few cycles. If the second variation of the reversed current waveform is not greater than the second threshold value before the transient startup time point for the reversed current waveform, the normal current waveform oscillates periodically and steadily after the transient startup time point.

In Step S220A, when the second variation of the reversed current waveform is greater than the second threshold value before the transient startup time point for the reversed current waveform, the processor 5 sets the transient cutoff time point at which the second variation is greater than the second threshold value, thereby determining that the present load has been completely turned on.

In Step S220B, when the second variation of the reversed current waveform is not greater than the second threshold value before the transient startup time point for the reversed current waveform, the processor 5 sets the transient cutoff time point based on the given upper limited number of oscillation cycles of the normal current waveform and the transient startup time point. The transient cutoff time point occurs after the transient startup time point for the normal current waveform. In order to prevent the time length of the given upper limited number of oscillation cycles from exceeding the time length of the window, the given upper limited number of oscillation cycles is preferably 4, but the invention is not limited thereto.

In Steps S220A and S220B, a process similar to Steps S140~S180 can also be employed to perform wavelet transform to obtain the actual transient cutoff time point. However, the transient cutoff time point is not a main factor for determining the type of the present load. It is not necessary to spend excessive time finding the actual transient cutoff time point, thereby leading to longer processing time for determining the type of the present load.

In Step S240, the processor 5 sets a turned-on time interval between the transient startup time point and the transient cutoff time point. The total current I in the turned-on time interval includes the transient current of the present load and the steady current of the other loads 2A. In order to filter out the steady current of the other loads 2A, the non-intrusive load identification method performs Step S260 and S280. In Step S260, the processor 5 sets a first transient time point before the transient startup time point located at the middle of a time interval between the first transient time point and the transient cutoff time point of the normal current waveform and sets a second transient time point before the first transient time point located at the middle of a time interval between the second transient time point and the transient startup time point of the normal current waveform. In Step S280, the processor 5 defines a first-time interval between the first transient time point and the transient cutoff time point of the normal current waveform, defines a second-time interval between the second transient time point and the transient startup time point of the normal current waveform, and obtains a different current waveform of the normal current waveform between the total current I during the first-time interval and the total current I during the second-time interval to serve as a transient turned-on current. The total current I during the first-time interval includes the transient current of the present load and the steady current of the other loads 2A. The total current I during the second-time interval includes the steady current of the other loads 2A.

In Step S300, the processor 5 processes the transient turned-on current based on wavelet transform and Parseval's theorem to obtain a power feature that includes power indices from the first scale to the twentieth scale. The approximation and detail values obtained through wavelet transform are processed based on Parseval's theorem.

In order to understand the purpose of using Parseval's theorem, it is explained as follows. Parseval's theorem is applied to Fourier series, where Bessel's inequalities are satisfied with equality, which means that the power in the time domain of a signal is equal to the power in the frequency domain of the signal. Therefore, in Step S280, based on the characteristics of multi-resolution analysis of wavelet transform, the decomposed analytical parameter signals retain all the information of the original signal (i.e., the transient turned-on current).

Although the results of a one-dimensional multi-level wavelet transform can effectively represent the features of power waveforms, it is challenging for data comparison. For instance, one-dimensional seven-level wavelet transform is performed to generate seven detail values and one approximation value, thereby resulting in eight waveforms versus time. This can be time-consuming in the identification process. Therefore, after the analytical parameter signal generated due to wavelet transform is processed based on Parseval's theorem, the time-domain waveform of the signal is transformed into frequency-domain power indices to reduce the complexity of identification. Based on Parseval's theorem, the power indices from the first scale to the twentieth scale are generated to form the power feature.

In the computation of Parseval's theorem, algebraic expressions for high-frequency power and low-frequency power are generated. The power indices include multiple high-frequency power indices and low-frequency power indices. Specifically, depending on the frequency of the sampling signal and the mains frequency, the power indices from the first scale to the eighth scale are high-frequency power indices and the power indices from the ninth scale to the twentieth scale are low-frequency power indices. In Step S320, the processor 5 obtains the power indices from the first scale to the eighth scale as the present power feature of the present load. In some embodiments, the processor 5 obtains the power indices from the first scale to the twelfth scale as the present power characteristic of the present load. The more the primary loads 2B, the more the scales are taken. When the more scales are taken, the computation speed is reduced and more memory space is required. In Step S340, the processor 5 compares the present power feature with the given power features to identify the type of the present load. Provided that substantially the same result is achieved, the steps of the flowcharts shown in FIGS. 3A-3B need not be in the exact order shown and need not be contiguous, that is, other steps can be intermediate.

On the other hand, in order to accurately identify the type of the present load, the processor 5 compares the present power feature with the given power features using systems with learning capabilities, such as machine learning, artificial neural networks, fuzzy logic systems, etc.

FIGS. 4A-4B are flowcharts of a non-intrusive load identification method when a present load of primary loads is turned off according to an embodiment of the invention. Referring to FIG. 2 and FIGS. 4A-4B, a non-intrusive load identification method will be introduced as follows. In the non-intrusive load identification method, the other loads 2A operate and only one of the primary loads 2B is turned off and identified. The non-intrusive load identification method employs the non-intrusive detection device 100 to detect the total current I on the main power line 1 (i.e., power entrance) of the power system 200 to identify the types of the primary loads 2B. In Step S400, the processor 5 establishes in the storage device 6 a database that includes given power features respectively corresponding to the primary loads 2B that are turned off.

In Step S420, the processor 5 sets parameters based on an operating environment. The operating environment includes, but is not limited to, parameters such as voltage frequency (typically the mains frequency of 60 Hz), sampling frequency (e.g., but not limited to, 10.08 kHz), the given number of oscillation cycles (e.g., but not limited to, 4 cycles), and cutoff threshold (e.g., but not limited to, 1.05 times). These parameters enable the non-intrusive load identification method to establish a mechanism for determining the turned-off state of the primary loads 2B. If the operating environment has been pre-set to a specific configuration or the parameters of the operating environment have been set to specific values, Step S420 can be omitted and is not essential for the execution of the non-intrusive load identification method according to the present invention.

In Step S440, the processor 5 obtains a varying time point at which the variation of the total current I is smaller than a threshold value when turning off a present load of the primary loads 2B to vary the total current I. This is because a transient current is generated to vary the total current I when the present load is turned off. The processor 5 presets the threshold value as a cutoff threshold being 1.05 times. Specifically, the processor 5 uses a window of some cycles to scan the waveform of the total current I from left to right and compares the first average value of current peaks of the total current I selected by the window at a previous time point with the second average value of current peaks of the total current I selected by the window at a next time point. When the second average value of the current peaks is smaller than 1.05 times the first average value of the current peaks, the variation of the total current I is smaller than the threshold value.

In Step S460, the processor 5 obtains the normal current waveform of the total current I during from a first time point to a second time point. The first time point occurs before the varying time point and the second time point occurs after the varying time point. In Step S480, the processor 5 horizontally flips the normal current waveform to obtain a reversed current waveform. In Step S500, the processor 5 obtains an enveloping waveform based on the absolute value of the reversed current waveform and performs wavelet transform on the enveloping waveform to obtain a wavelet waveform. In Step S520, the processor 5 sets the transient cutoff time point of the present load corresponding to the maximum value of the wavelet waveform. In Step S540, the processor 5 horizontally flips the reversed current waveform to obtain the normal current waveform and sets the transient startup time point of the present load based on the given upper limited number of oscillation cycles of the normal current waveform before the transient cutoff time point. When the present load is turned off, the total current I usually enter a steady state rather than enters a state like Step S220A. As a result, the upper limited number of oscillation cycles of the normal current waveform is equal to or less than 4.

In Step S560, the processor 5 sets a turned-off time interval between the transient startup time point and the transient cutoff time point. In Step S580, the processor 5 sets a first transient time point after the transient cutoff time point located at the middle of a time interval between the first transient time point and the transient startup time point and sets a second transient time point after the first transient time point located at the middle of a time interval between the second transient time point and the transient cutoff time point. When the present load is turned off, a transient current is generated to vary the total current I after the transient startup time point. In Step S600, the processor 5 defines a first-time interval between the first transient time point and the transient startup time point, defines a second-time interval between the second transient time point and the transient cutoff time point, and obtains a different current waveform between the total current during the first-time interval and the total current during the second-time interval to serve as a transient turned-off current. In Step S620, the processor 5 processes the transient turned-off current based on wavelet transform and Parseval's theorem to obtain a power feature that includes power indices from the first scale to the twentieth scale. In Step S640, the processor 5 obtains the power indices from the first scale to the eighth scale as the present power feature of the present load. In some embodiments, the processor 5 obtains the power indices from the first scale to the twelfth scale as the present power feature of the present load. In Step S660, the processor 5 compares the present power feature with the given power features to identify the type of the present load. Provided that substantially the same result is achieved, the steps of the flowcharts shown in FIGS. 4A-4B need not be in the exact order shown and need not be contiguous, that is, other steps can be intermediate.

Figure 5:
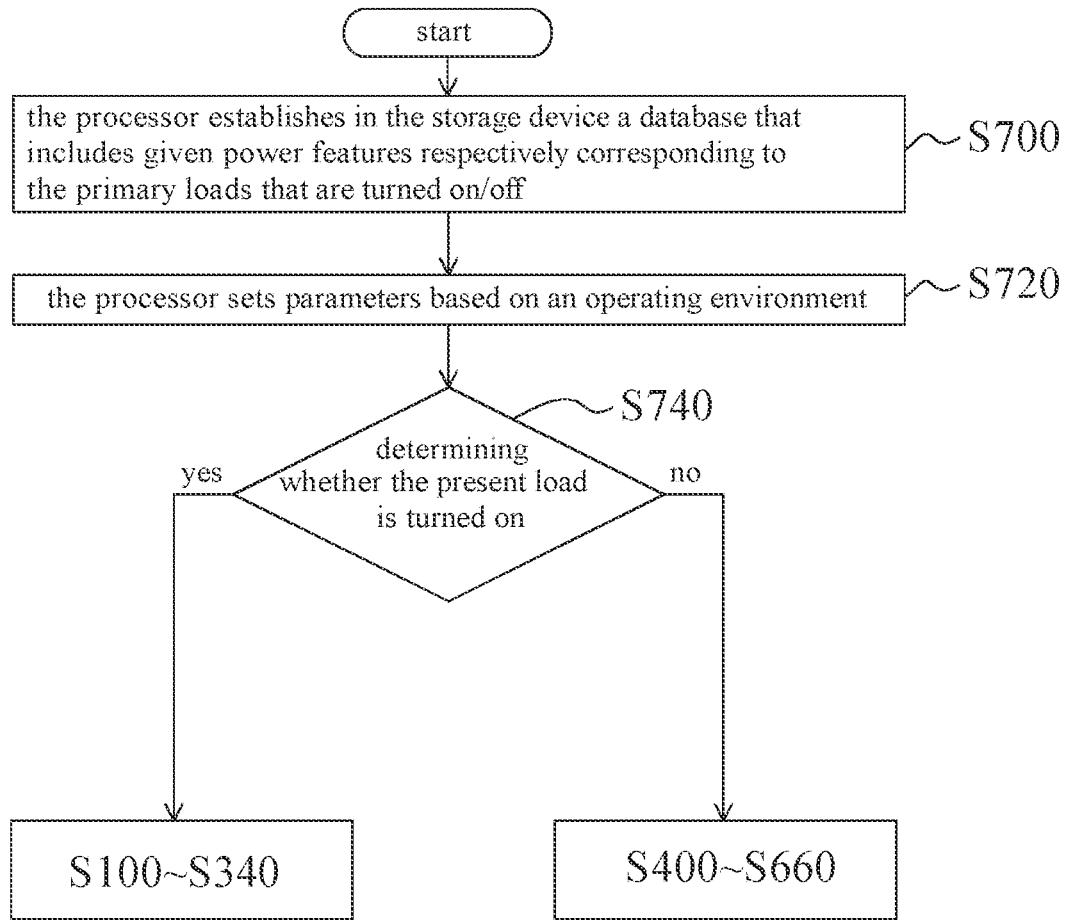
FIG. 5 is a flowchart of a non-intrusive load identification method when a present load of primary loads is turned on/off according to an embodiment of the invention.

FIG. 5 is a flowchart of a non-intrusive load identification method when a present load of primary loads is turned on/off according to an embodiment of the invention. FIG. 5 includes FIGS. 2A-2B and FIGS. 3A-3B. Referring to FIG. 5 and FIG. 2, the non-intrusive load identification method is introduced as follows. In Step S700, the processor 5 establishes in the storage device 6 a database that includes given power features respectively corresponding to the primary loads 2B that are turned on/off.

In Step S720, the processor 5 sets parameters based on an operating environment. The operating environment includes, but is not limited to, parameters such as voltage frequency (typically the mains frequency of 60 Hz), sampling frequency (e.g., but not limited to, 10.08 kHz), the given number of oscillation cycles (e.g., but not limited to, 4 cycles), and startup/cutoff threshold (e.g., but not limited to, 1.05 times). These parameters enable the non-intrusive load identification method to establish a mechanism for determining the turned-on/off state of the primary loads 2B. If the operating environment has been pre-set to a specific configuration or the parameters of the operating environment have been set to specific values, Step S720 can be omitted and is not essential for the execution of the non-intrusive load identification method according to the present invention. In Step S740, the process determines whether the present load is turned on. If the result is yes, the process proceeds to Steps S100~S340. If the result is no, the process proceeds to Steps S400~S660.

In addition, the loads 2-1~2-M include the primary loads 2B and the other loads 2A. As a result, when the present power feature is not identical or similar to the given power features in the database, the processor 5 determines that the present load is one of the other loads 2A.

Figure 6A:
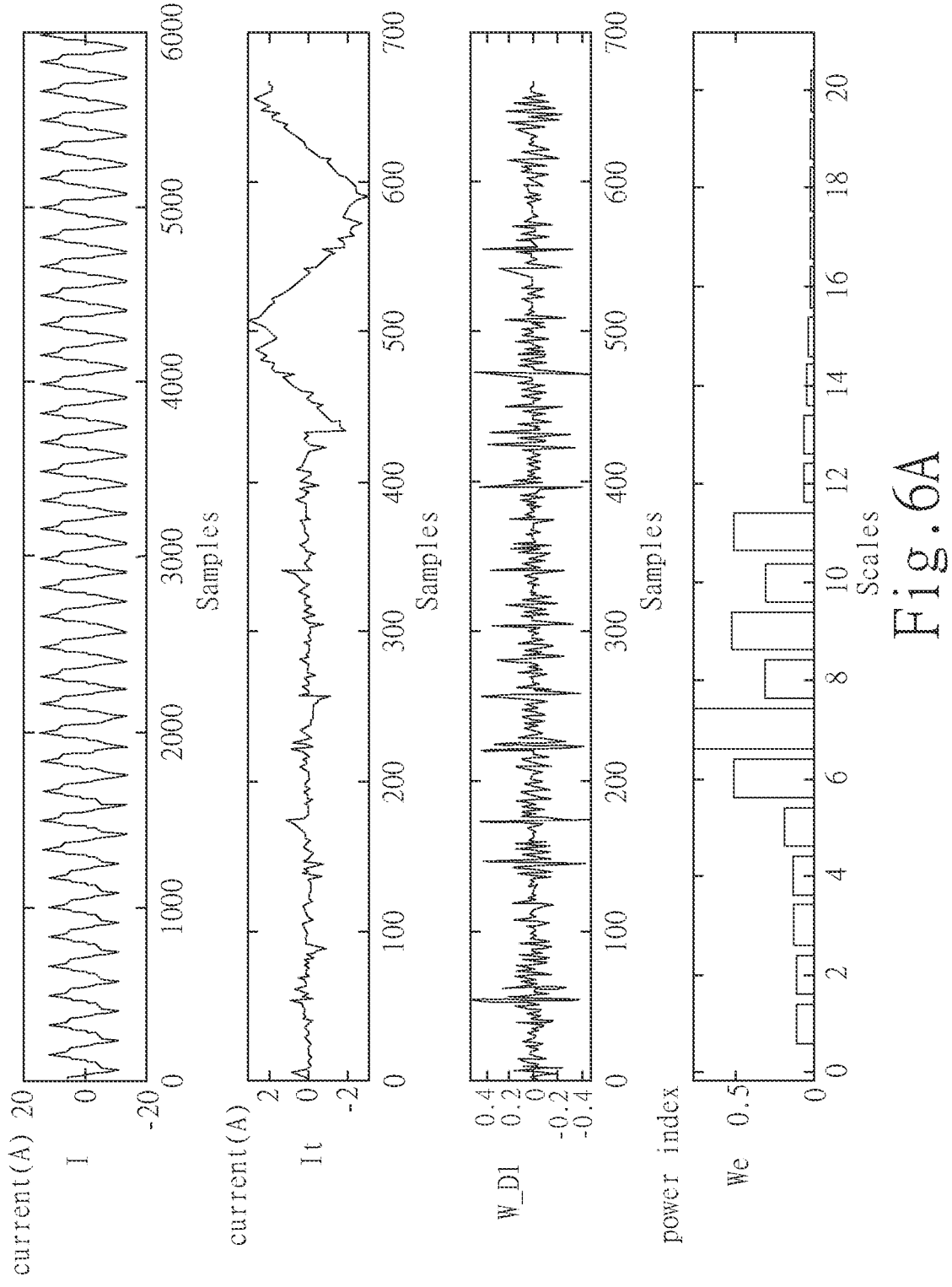
FIG. 6A is a diagram schematically illustrating a current waveform when a hair dryer is turned on according to an embodiment of the invention.
Figure 6B:
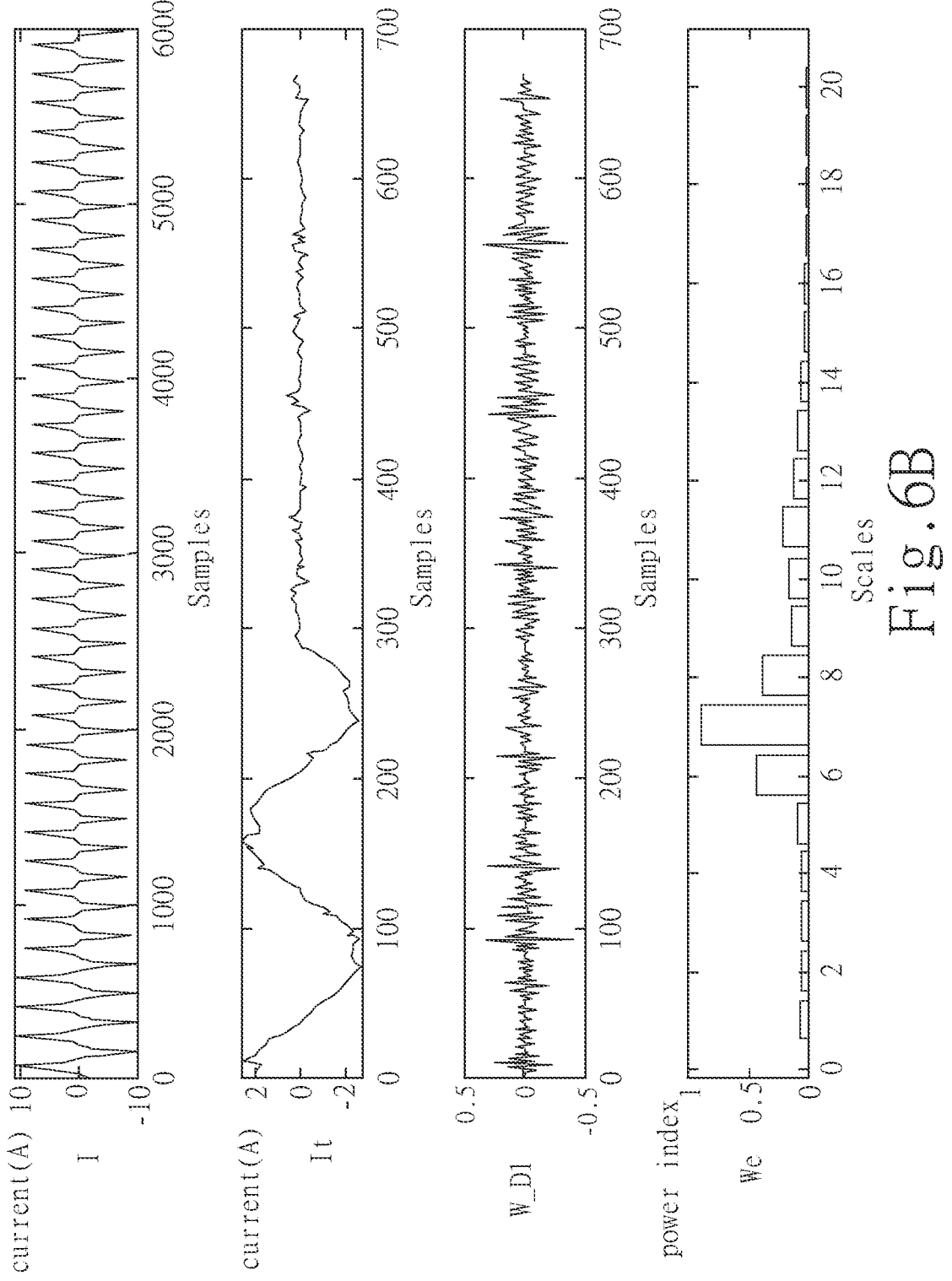
FIG. 6B is a diagram schematically illustrating a current waveform when a hair dryer is turned off according to an embodiment of the invention.

FIG. 6A is a diagram schematically illustrating a current waveform when a hair dryer is turned on according to an embodiment of the invention. FIG. 6B is a diagram schematically illustrating a current waveform when a hair dryer is turned off according to an embodiment of the invention. Refer to FIGS. 2, 3A-3B, and 4A-4B. The processor 5 can records the waveform of the total current I for turning on the hair dryer. Using the flowcharts in FIGS. 3A-3B, the total current I is processed to obtain the transient turned-on current It of the present load, the wavelet waveform W_D1 whose wavelet coefficients are d1, and the power feature We that includes power indices from the first scale to the twentieth scale. Compared with the waveform in FIG. 6A, the waveform in FIG. 6B is reversed. As a result, the waveform in FIG. 6B is flipped to roughly obtain the waveform in FIG. 6A, thereby increasing the operation speed of the processor 5. The processor 5 can obtain the power indices from the first scale to the eighth scale or the twelfth scale as the present power feature of the present load and compares the present power feature with the given power features in the database to identify that the present load is a hair dryer.

Figure 7A:
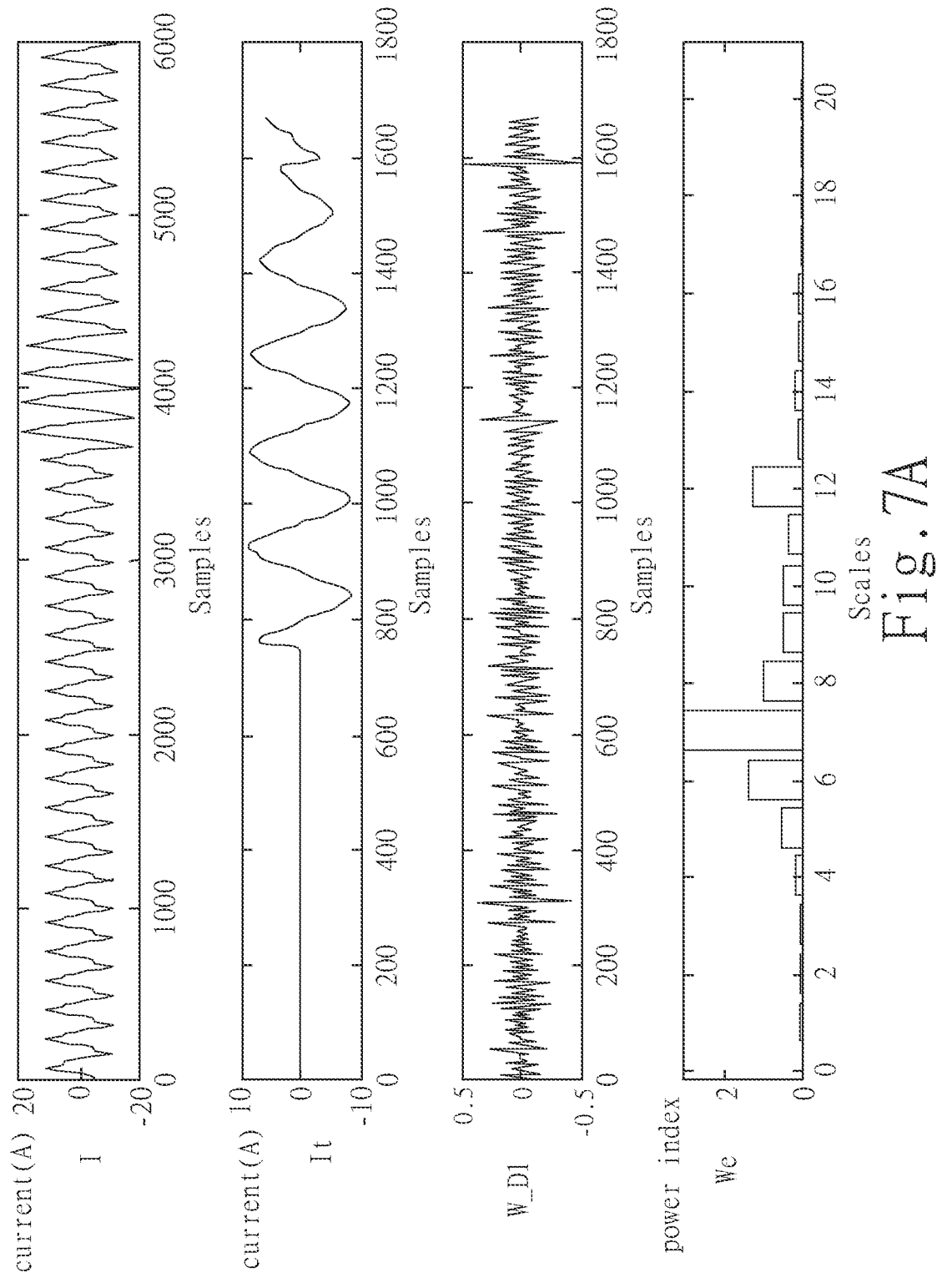
FIG. 7A is a diagram schematically illustrating a current waveform when a dehumidifier is turned on according to an embodiment of the invention.
Figure 7B:
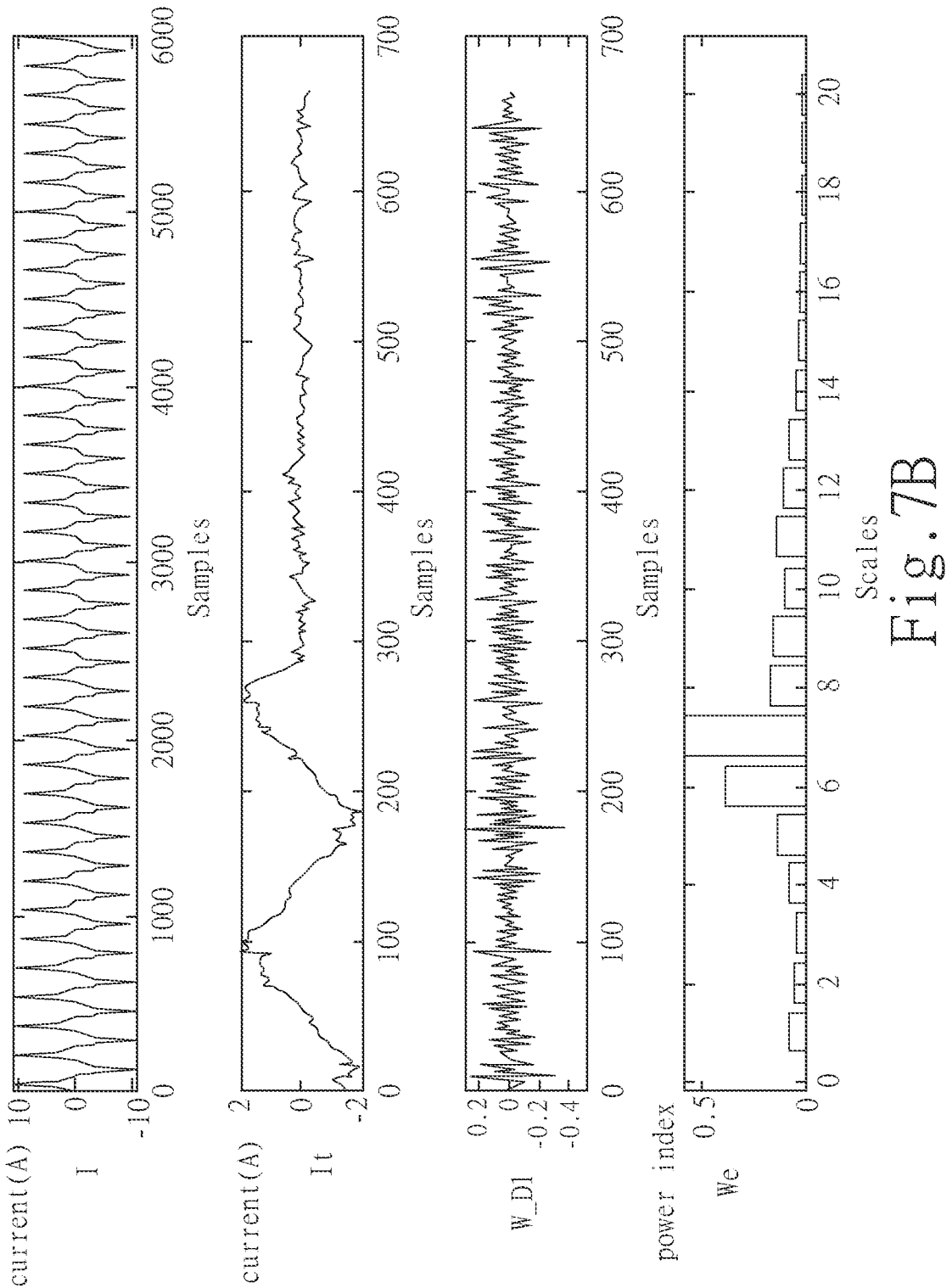
FIG. 7B is a diagram schematically illustrating a current waveform when a dehumidifier is turned off according to an embodiment of the invention.
Figure 8A:
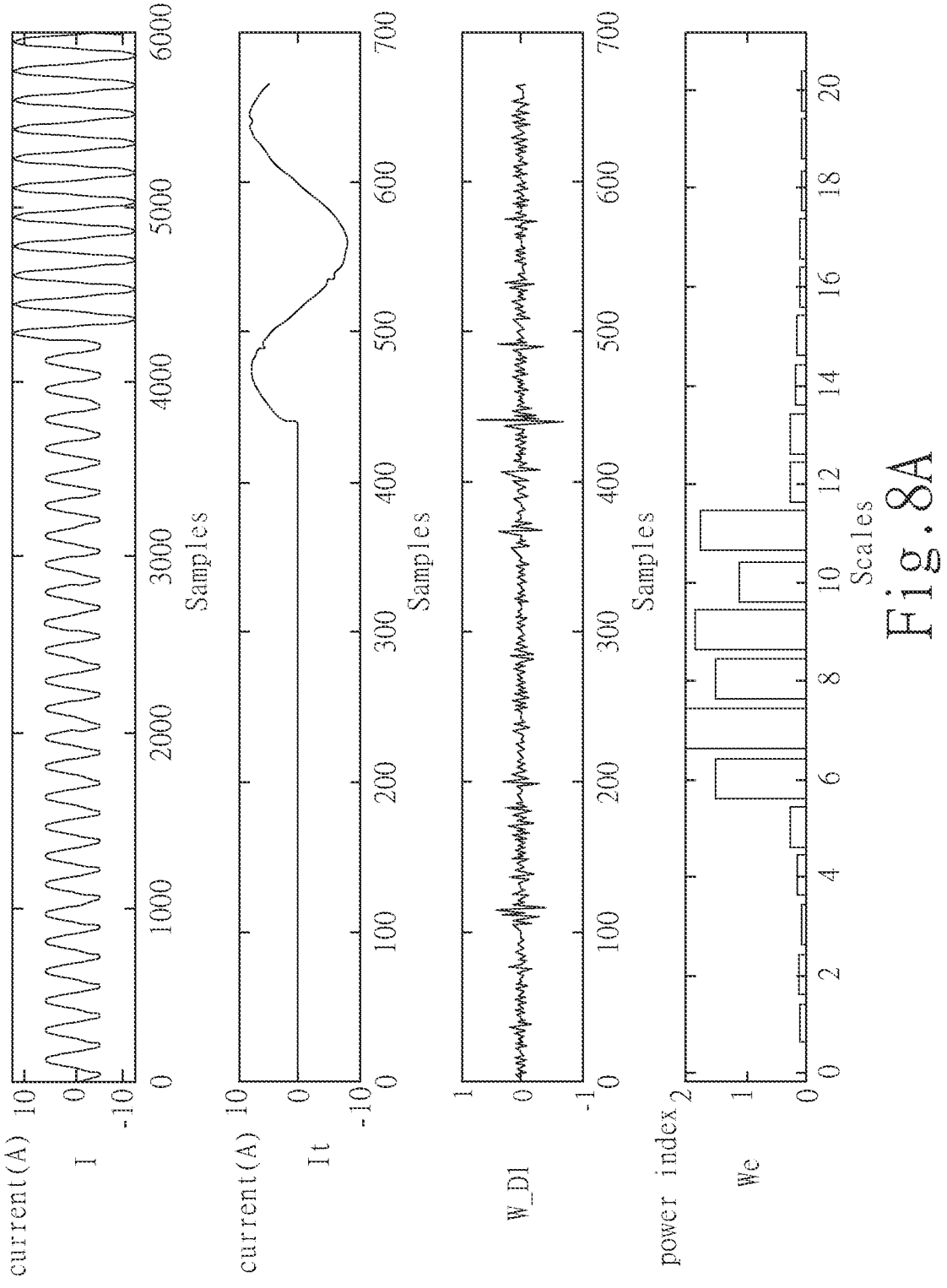
FIG. 8A is a diagram schematically illustrating a current waveform when a water dispenser is turned on according to an embodiment of the invention.
Figure 8B:
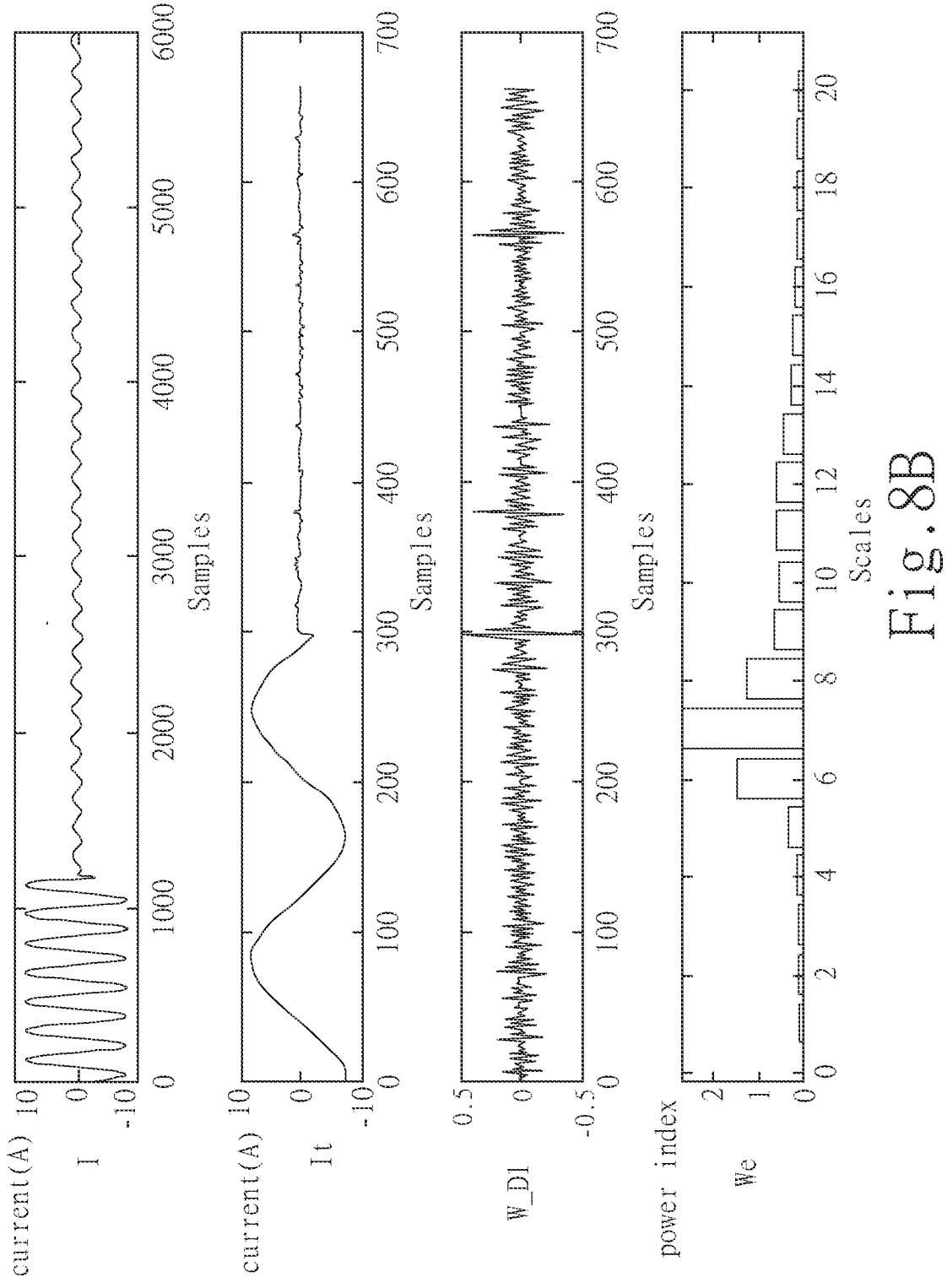
FIG. 8B is a diagram schematically illustrating a current waveform when a water dispenser is turned off according to an embodiment of the invention.
Figure 9A:
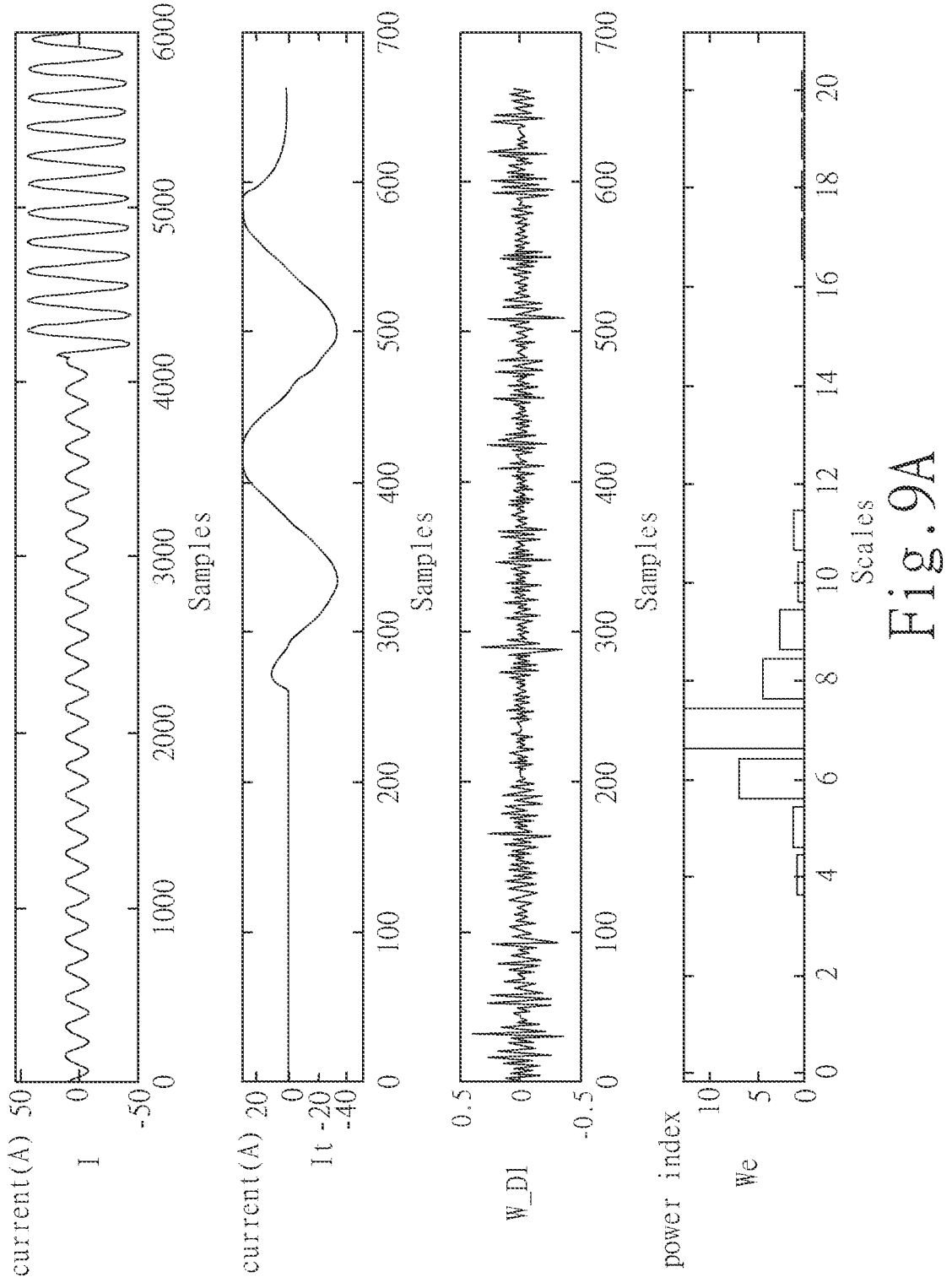
FIG. 9A is a diagram schematically illustrating a current waveform when a refrigerator is turned on according to an embodiment of the invention.
Figure 9B:
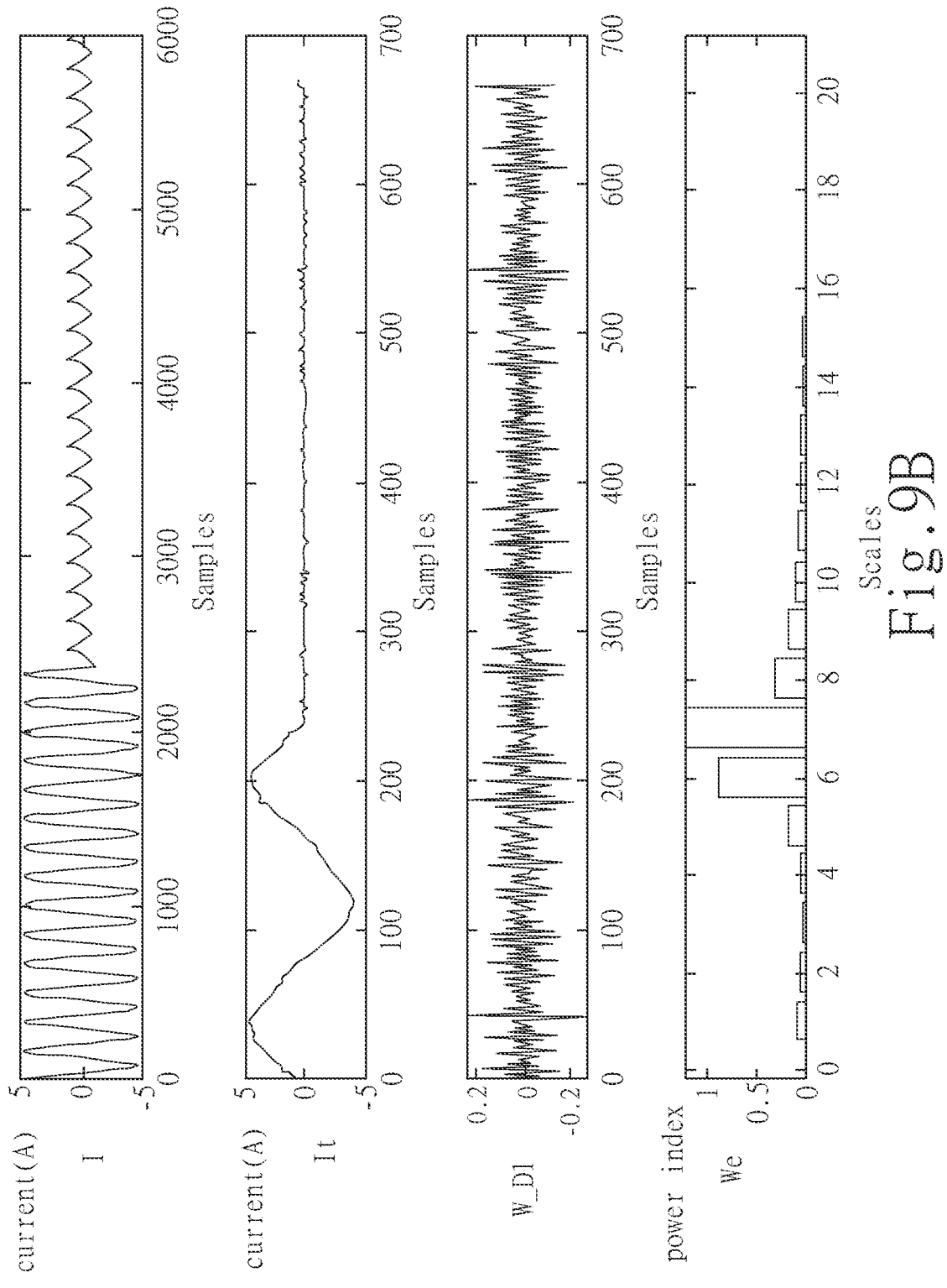
FIG. 9B is a diagram schematically illustrating a current waveform when a refrigerator is turned off according to an embodiment of the invention.

FIG. 7A is a diagram schematically illustrating a current waveform when a dehumidifier is turned on according to an embodiment of the invention. FIG. 7B is a diagram schematically illustrating a current waveform when a dehumidifier is turned off according to an embodiment of the invention. FIG. 8A is a diagram schematically illustrating a current waveform when a water dispenser is turned on according to an embodiment of the invention. FIG. 8B is a diagram schematically illustrating a current waveform when a water dispenser is turned off according to an embodiment of the invention. FIG. 9A is a diagram schematically illustrating a current waveform when a refrigerator is turned on according to an embodiment of the invention. FIG. 9B is a diagram schematically illustrating a current waveform when a refrigerator is turned off according to an embodiment of the invention. In FIGS. 8A-8B, the water dispenser is not an inductive or electromagnetic load and the transient turned-on current It of the water dispenser periodically and steadily oscillates. Thus, FIGS. 8A-8B are suitable to Step S220B or Step S540. In addition, FIGS. 7A-7B and FIGS. 9A-9B are similar to FIGS. 6A-6B. The hair dryer, the dehumidifier, and the refrigerator are inductive or electromagnetic loads.

Table 1 represents the test results when 5 primary loads are turned on. Table 2 represents the test results when 9 primary loads are turned on. Table 3 represents the test results when 12 primary loads are turned on. Table 4 represents the statistical results of Tables 1, 2, and 3. Each primary load has 15 pieces of data that are individually provided for testing. Thus, Table 1 represents a total of 15×5=75 pieces of data, Table 2 represents a total of 15×9=135 pieces of data, and Table 3 represents a total of 15×12=180 pieces of data.

TABLE 1

| | load | | | | |
| result | air conditioner | de-humidifier | washing machine | rice cooker | electric water heater |
|---|---|---|---|---|---|
| air conditioner | 15 | | | | |
| dehumidifier | | 15 | | | |
| washing machine | | | 15 | | |
| rice cooker | | | | 15 | |
| electric water heater | | | | | 15 |

TABLE 2

| | load | | | | |
| result | air conditioner | de-humidifier | washing machine | rice cooker | electric water heater |
|---|---|---|---|---|---|
| air conditioner | 11 | | | | |
| dehumidifier | | 15 | | | |
| washing machine | | | 15 | | |
| rice cooker | | | | 14 | |
| electric water heater | | | | | 15 |
| LCD and video box | 3 | | | | |
| induction cooker | 1 | | | 1 | |
| hair dryer | | | | | |
| clothes dryer | | | | | |

| | load | | | |
| result | LCD and video box | induction cooker | hair dryer | clothes dryer |
|---|---|---|---|---|
| air conditioner | | | | 2 |
| dehumidifier | | | 1 | |
| washing machine | | | | |
| rice cooker | | | | |
| electric water heater | | | | |
| LCD and video box | 15 | | | 2 |
| induction cooker | | 14 | | |
| hair dryer | | | 14 | |
| clothes dryer | | 1 | | 11 |

TABLE 3

| | load | | | | |
| result | air conditioner | de-humidifier | washing machine | rice cooker | electric water heater |
|---|---|---|---|---|---|
| air conditioner | 12 | | | | |
| dehumidifier | | 14 | | | |
| washing machine | | | 15 | | |
| rice cooker | | | | 15 | |
| electric water heater | | | | | 15 |

15

TABLE 3-continued

| result | LCD and video box | air purifier | smart TV | induction cooker | hair dryer |
|---|---|---|---|---|---|
| LCD and video box | 1 | | | | |
| air purifier | | | | | |
| smart TV | | | 2 | | |
| induction cooker | | | | | |
| hair dryer | | | | | 1 |
| clothes dryer | | | | | |
| electric fans | | | | | |

| | load | | | | |
|---|---|---|---|---|---|
| result | LCD and video box | air purifier | smart TV | induction cooker | hair dryer |
| air conditioner | 1 | | | 1 | |
| dehumidifier | | | | | 1 |
| washing machine | | | | | |
| rice cooker | | | | | |
| electric water heater | | | | | |
| LCD and video box | 14 | | | 1 | |
| air purifier | | 15 | | | |
| smart TV | | | 15 | | |
| induction cooker | | | | 13 | |
| hair dryer | | | | | 14 |
| clothes dryer | | | | | |
| electric fans | | | | | |

| | load | |
|---|---|---|
| result | clothes dryer | electric fans |
| air conditioner | 3 | |
| dehumidifier | | |
| washing machine | | |
| rice cooker | | |
| electric water heater | | |
| LCD and video box | 2 | |
| air purifier | | |
| smart TV | | |
| induction cooker | | 1 |
| hair dryer | | |
| clothes dryer | 10 | 2 |
| electric fans | | 12 |

TABLE 4

| Turned on | 5 primary loads | 9 primary loads | 12 primary loads |
|---|---|---|---|
| | 100% (75/75) | 91.8519% (124/135) | 91.1111% (164/180) |

Table 4 represents that the non-intrusive detection device achieves 100% accuracy when the number of primary loads is 5. Out of 135 data, the number of accurately judged data is 124 (91.8%) when the number of primary loads is 9. Therefore, when the number of primary loads decreases, the accuracy in identifying the types of primary loads increases and vice versa.

Table 5 represents the test results when 5 primary loads are turned off. Table 6 represents the test results when 9 primary loads are turned off. Table 7 represents the test results when 12 primary loads are turned off. Table 8 represents the statistical results of Tables 5, 6, and 7. Each primary load has 15 pieces of data that are individually provided for testing. Thus, Table 5 represents a total of 15×5=75 pieces of data, Table 6 represents a total of 15×9=135 pieces of data, and Table 7 represents a total of 15×12=180 pieces of data.

TABLE 5

| | load | | | | |
|---|---|---|---|---|---|
| result | air conditioner | dehumidifier | washing machine | rice cooker | electric water heater |
| air conditioner | 14 | | 2 | | |
| dehumidifier | | 15 | | | |
| washing machine | | | 13 | | |
| rice cooker | 1 | | | 15 | |
| electric water heater | | | | | 15 |

TABLE 6

| | load | | | | |
|---|---|---|---|---|---|
| result | air conditioner | dehumidifier | washing machine | rice cooker | electric water heater |
| air conditioner | 15 | | 2 | | |
| dehumidifier | | 15 | | | |
| washing machine | | | 12 | | |
| rice cooker | | | | 15 | |
| electric water heater | | | | | 15 |
| LCD and video box | 3 | | 1 | | |
| induction cooker | 1 | | | | |
| hair dryer | | | | | |
| clothes dryer | | | | | |

| | load | | | |
|---|---|---|---|---|
| result | LCD and video box | induction cooker | hair dryer | clothes dryer |
| air conditioner | | | | |
| dehumidifier | | | 1 | |
| washing machine | | | | 1 |
| rice cooker | | | | |
| electric water heater | | | | |
| LCD and video box | 15 | | | 7 |
| induction cooker | | 15 | | |
| hair dryer | | | 15 | |
| clothes dryer | | | | 7 |

TABLE 7

| | load | | | | |
|---|---|---|---|---|---|
| result | air conditioner | dehumidifier | washing machine | rice cooker | electric water heater |
| air conditioner | 15 | | 2 | | |
| dehumidifier | | 10 | | | |

17

TABLE 7-continued

| result | washing machine | rice cooker | electric water heater |
|---|---|---|---|
| washing machine | 12 | | |
| rice cooker | | 15 | |
| electric water heater | | | 15 |
| LCD and video box | | 1 | |
| air purifier | 2 | | |
| smart TV | 1 | | |
| induction cooker | | | |
| hair dryer | | | |
| clothes dryer | | | |
| electric fans | 2 | | |

| | load | | | | |
|---|---|---|---|---|---|
| result | LCD and video box | air purifier | smart TV | induction cooker | hair dryer |
| air conditioner | | | | | |
| dehumidifier | | 8 | 1 | | |
| washing machine | | | | | |
| rice cooker | | | | | |
| electric water heater | | | | | |
| LCD and video box | 14 | | | | |
| air purifier | | 5 | 1 | | |
| smart TV | | 2 | 9 | | |
| induction cooker | | | | 15 | |
| hair dryer | | | | | 15 |
| clothes dryer | 1 | | | | |
| electric fans | | | 4 | | |

| | load | |
|---|---|---|
| result | clothes dryer | electric fans |
| air conditioner | | |
| dehumidifier | | 4 |
| washing machine | | |
| rice cooker | | |
| electric water heater | | |
| LCD and video box | 7 | |
| air purifier | | 2 |
| smart TV | | 2 |
| induction cooker | | |
| hair dryer | | |
| clothes dryer | 8 | |
| electric fans | | 7 |

TABLE 8

| Turned off | 5 primary loads | 9 primary loads | 12 primary loads |
|---|---|---|---|
| | 96% (72/75) | 91.8519% (124/135) | 77.7778% (141/180) |

Table 8 represents that the non-intrusive detection device achieves 96% accuracy when the number of primary loads is 5. Out of 135 data, the number of accurately judged data is 124 (91.8%) when the number of primary loads is 9. Therefore, when the number of primary loads decreases, the accuracy in identifying the types of primary loads increases and vice versa. Therefore, comparing the results in Tables 4 and 8 reveals that the transient current of the primary load has a greater variation and a more apparent power signature when the primary load is turned on. Consequently, the non-intrusive detection device can achieve the higher identification accuracy. In Table 2, the air conditioner has 15 pieces of data. However, 11 pieces of data are identified as an air conditioner, 3 pieces of data are incorrectly identified as a LCD and video box, and 1 piece of data is incorrectly identified as an induction cooker. Therefore, the identification accuracy is more than 70%. The test results of other loads are similar to those of the air conditioner and thus not reiterated.

In addition to the main effect of the invention, the invention can enhance abilities for identifying individual operating load that is turned on/off and improve abilities for identifying similar loads and loads that are simultaneously turned on/off. Furthermore, the invention can identify the deterioration (aging) of loads and the abnormal operation of loads and simultaneously achieve the load identification of the primary load having the multiple number of operating states.

The embodiments described above are only to exemplify the invention but not to limit the scope of the invention. Therefore, any equivalent modification or variation according to the shapes, structures, features, or spirit disclosed by the invention is to be also included within the scope of the invention.

What is claimed is:

1. A non-intrusive load identification method employing a non-intrusive detection device to detect a total current on a main power line of a power system to identify types of primary loads, the main power line coupled to the non-intrusive detection device, other loads that operate and the primary loads, and the non-intrusive load identification method comprising:

establishing a database that includes given power features respectively corresponding to the primary loads that are turned on;

obtaining a varying time point at which a first variation of the total current is greater than a first threshold value when turning on a present load of the primary loads to vary the total current;

obtaining a normal current waveform of the total current during from a first time point to a second time point, wherein the first time point occurs before the varying time point and the second time point occurs after the varying time point;

obtaining an enveloping waveform based on an absolute value of the normal current waveform and performing wavelet transform on the enveloping waveform to obtain a wavelet waveform;

setting a transient startup time point of the present load corresponding to a maximum value of the wavelet waveform;

horizontally flipping the normal current waveform to obtain a reversed current waveform;

determining whether a second variation of the reversed current waveform is greater than a second threshold value before the transient startup time point for the reversed current waveform to set a transient cutoff time point of the present load:

when the second variation of the reversed current waveform is greater than the second threshold variation, setting the transient cutoff time point at which the second variation is greater than the second threshold value; and when the second variation of the reversed current waveform is not greater than the second threshold value, setting the transient cutoff time point based on given upper limited number of oscillation cycles of the normal current waveform and the transient startup time point;

setting a turned-on time interval between the transient startup time point and the transient cutoff time point;

setting a first transient time point before the transient startup time point located at middle of a time interval between the first transient time point and the transient cutoff time point of the normal current waveform and setting a second transient time point before the first transient time point located at middle of a time interval between the second transient time point and the transient startup time point of the normal current waveform;

defining a first-time interval between the first transient time point and the transient cutoff time point of the normal current waveform, defining a second-time interval between the second transient time point and the transient startup time point of the normal current waveform, and obtaining a different current waveform of the normal current waveform between the total current during the first-time interval and the total current during the second-time interval to serve as a transient turned-on current;

processing the transient turned-on current based on wavelet transform and Parseval's theorem to obtain a power feature that includes power indices from a first scale to a twentieth scale;

obtaining the power indices from the first scale to an eighth scale as a present power feature of the present load;

comparing the present power feature with the given power features to identify a type of the present load;

calculating, by a power management system coupled to the non-intrusive detection device, a usage demand of the primary loads based on the identified type of the present loads based on the identified type of the present load; and generating a reminder for a user to save power and reduce unnecessary power consumption based on the calculated usage demand.

2. The non-intrusive load identification method according to claim 1, wherein in the step of obtaining the power indices from the first scale to the eighth scale as the present power feature, the power indices from the first scale to a twelfth scale are obtained as the present power feature.

3. A non-intrusive load identification method employing a non-intrusive detection device to detect a total current on a main power line of a power system to identify types of primary loads, the main power line coupled to the non-intrusive detection device, other loads that operate and the primary loads, and the non-intrusive load identification method comprising:

establishing a database that includes given power features respectively corresponding to the primary loads that are turned off;

obtaining a varying time point at which a variation of the total current is smaller than a threshold value when turning off a present load of the primary loads to vary the total current;

obtaining a normal current waveform of the total current during from a first time point to a second time point, wherein the first time point occurs before the varying time point and the second time point occurs after the varying time point;

horizontally flipping the normal current waveform to obtain a reversed current waveform;

obtaining an enveloping waveform based on an absolute value of the reversed current waveform and performing wavelet transform on the enveloping waveform to obtain a wavelet waveform;

setting a transient cutoff time point of the present load corresponding to a maximum value of the wavelet waveform;

horizontally flipping the reversed current waveform to obtain the normal current waveform and setting a transient startup time point of the present load based on given upper limited number of oscillation cycles of the normal current waveform before the transient cutoff time point;

setting a turned-off time interval between the transient startup time point and the transient cutoff time point;

setting a first transient time point after the transient cutoff time point located at middle of a time interval between the first transient time point and the transient startup time point and setting a second transient time point after the first transient time point located at middle of a time interval between the second transient time point and the transient cutoff time point;

defining a first-time interval between the first transient time point and the transient startup time point, defining a second-time interval between the second transient time point and the transient cutoff time point, and obtaining a different current waveform between the total current during the first-time interval and the total current during the second-time interval to serve as a transient turned-off current;

processing the transient turned-off current based on wavelet transform and Parseval's theorem to obtain a power feature that includes power indices from a first scale to a twentieth scale;

obtaining the power indices from the first scale to an eighth scale as a present power feature of the present load;

comparing the present power feature with the given power features to identify a type of the present load;

calculating, by a power management system coupled to the non-intrusive detection device, a usage demand of the primary loads based on the identified type of the present loads based on the identified type of the present load; and generating a reminder for a user to save power and reduce unnecessary power consumption based on the calculated usage demand.

4. The non-intrusive load identification method according to claim 3, wherein in the step of obtaining the power indices from the first scale to the eighth scale as the present power feature, the power indices from the first scale to a twelfth scale are obtained as the present power feature.

* * * * *